(12) United States Patent
Buehne et al.

(10) Patent No.: US 9,792,321 B2
(45) Date of Patent: Oct. 17, 2017

(54) ONLINE DATABASE MIGRATION

(71) Applicant: ORACLE INTERNATIONAL CORPORATION, Redwood Shores, CA (US)

(72) Inventors: Stephan Buehne, Treibweg (DE); Elmar Spiegelberg, Am Kleefeldchen (DE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 393 days.

(21) Appl. No.: 13/937,545

(22) Filed: Jul. 9, 2013

(65) Prior Publication Data

US 2015/0019487 A1    Jan. 15, 2015

(51) Int. Cl.
*G06F 7/00* (2006.01)
*G06F 17/00* (2006.01)
*G06F 17/30* (2006.01)

(52) U.S. Cl.
CPC ...... *G06F 17/30377* (2013.01); *G06F 17/303* (2013.01); *G06F 17/30079* (2013.01)

(58) Field of Classification Search
CPC .................... G06F 17/303; G06F 17/30079
USPC .......................................................... 707/602
See application file for complete search history.

(56) References Cited

U.S. PATENT DOCUMENTS 6,016,394 A    1/2000  Walker
6,185,625 B1   2/2001  Tso et al.
6,477,483 B1   11/2002 Scarlat et al.
6,738,811 B1   5/2004  Liang
6,973,489 B1   12/2005 Levy
7,177,866 B2   2/2007  Holenstein et al.
7,290,003 B1   10/2007 Tong
(Continued)

FOREIGN PATENT DOCUMENTS

CN    1652087 A     8/2005
CN    102656565     9/2012
(Continued)

OTHER PUBLICATIONS

U.S. Appl. No. 13/937,977, Non-Final Office Action mailed on Aug. 12, 2014, 28 pages.
(Continued)

*Primary Examiner* — Van Oberly
(74) *Attorney, Agent, or Firm* — Kilpatrick Townsend & Stockton LLP

(57) ABSTRACT

Various arrangements for performing an online migration between server systems is presented. A transfer, from a source server system to a target server system, of a database, may be initiated. During the transfer, the database of the source server system may remain online. A timing indication of when transfer of the database was initiated may be recorded. While transferring the database, modifications to the records of the database may be received. The plurality of modifications may be stored, and, for each modification of the plurality of modifications, a timing indication of when the modification was received may be stored. After completing the transfer of the database to the target server system, the plurality of modifications to the database stored by the target server system may be applied while the source server system is online.

20 Claims, 7 Drawing Sheets

(56) References Cited

U.S. PATENT DOCUMENTS

| | | | |
|---|---|---|---|
| 7,548,898 B1 | 6/2009 | Tarenskeen et al. | |
| 7,580,862 B1 | 8/2009 | Montelo et al. | |
| 7,693,983 B1 | 4/2010 | Gupta et al. | |
| 8,150,811 B1* | 4/2012 | Tarenskeen | G06F 17/303 707/659 |
| 8,271,757 B1 | 9/2012 | Chatterjee et al. | |
| 8,606,894 B1 | 12/2013 | Fremont et al. | |
| 8,639,989 B1 | 1/2014 | Sorenson, III et al. | |
| 8,924,353 B1 | 12/2014 | Patwardhan et al. | |
| 8,943,032 B1 | 1/2015 | Xu et al. | |
| 9,098,364 B2 | 8/2015 | Davis | |
| 9,442,983 B2 | 9/2016 | Higginson et al. | |
| 9,491,072 B2 | 11/2016 | Raghunathan et al. | |
| 2001/0029502 A1 | 10/2001 | Oeda | |
| 2002/0002578 A1 | 1/2002 | Yamashita | |
| 2002/0019826 A1 | 2/2002 | Tan | |
| 2002/0147645 A1 | 10/2002 | Alao et al. | |
| 2002/0194329 A1 | 12/2002 | Alling | |
| 2002/0198984 A1 | 12/2002 | Goldstein et al. | |
| 2003/0066049 A1 | 4/2003 | Atwood et al. | |
| 2003/0069903 A1* | 4/2003 | Gupta | G06F 17/30306 |
| 2003/0192028 A1 | 10/2003 | Gusler et al. | |
| 2004/0098425 A1 | 5/2004 | Wiss et al. | |
| 2004/0167840 A1 | 8/2004 | Tully et al. | |
| 2004/0178261 A1 | 9/2004 | Potonniee et al. | |
| 2004/0181790 A1 | 9/2004 | Herrick | |
| 2004/0260875 A1 | 12/2004 | Murotani et al. | |
| 2005/0021567 A1 | 1/2005 | Holenstein et al. | |
| 2005/0055446 A1 | 3/2005 | Chidambaran et al. | |
| 2005/0102318 A1 | 5/2005 | Odhner et al. | |
| 2005/0204241 A1 | 9/2005 | Tamakoshi | |
| 2006/0059253 A1 | 3/2006 | Goodman et al. | |
| 2006/0112247 A1 | 5/2006 | Ramany et al. | |
| 2006/0156086 A1 | 7/2006 | Flynn et al. | |
| 2006/0173875 A1 | 8/2006 | Stefaniak et al. | |
| 2006/0179171 A1 | 8/2006 | Stefaniak et al. | |
| 2006/0179431 A1 | 8/2006 | Devanathan et al. | |
| 2006/0235899 A1 | 10/2006 | Tucker | |
| 2006/0282825 A1 | 12/2006 | Taylor | |
| 2007/0150488 A1 | 6/2007 | Barsness et al. | |
| 2007/0239774 A1 | 10/2007 | Bodily et al. | |
| 2007/0299892 A1 | 12/2007 | Nakahara | |
| 2008/0247320 A1 | 10/2008 | Grah et al. | |
| 2008/0313595 A1 | 12/2008 | Boulineau et al. | |
| 2009/0070733 A1 | 3/2009 | Huang et al. | |
| 2009/0113399 A1 | 4/2009 | Tzoref et al. | |
| 2009/0187413 A1 | 7/2009 | Abels et al. | |
| 2009/0210857 A1 | 8/2009 | Martineau | |
| 2009/0238078 A1 | 9/2009 | Robinson et al. | |
| 2009/0313311 A1 | 12/2009 | Hoffmann et al. | |
| 2010/0005097 A1 | 1/2010 | Liang et al. | |
| 2010/0191884 A1 | 7/2010 | Holenstein et al. | |
| 2010/0192156 A1 | 7/2010 | Hollingsworth | |
| 2010/0198799 A1 | 8/2010 | Krishnan et al. | |
| 2010/0262974 A1 | 10/2010 | Uyeda | |
| 2011/0093436 A1 | 4/2011 | Zha et al. | |
| 2011/0107327 A1 | 5/2011 | Barkie et al. | |
| 2011/0161933 A1 | 6/2011 | Hudson | |
| 2012/0017112 A1 | 1/2012 | Broda et al. | |
| 2012/0041933 A1* | 2/2012 | Driesen | G06F 17/303 707/702 |
| 2012/0150642 A1 | 6/2012 | Kandanala et al. | |
| 2012/0221845 A1 | 8/2012 | Ferris | |
| 2012/0254435 A1 | 10/2012 | Zhaofu et al. | |
| 2012/0265726 A1 | 10/2012 | Padmanabhan et al. | |
| 2012/0284360 A1 | 11/2012 | Bense et al. | |
| 2012/0297016 A1 | 11/2012 | Iyer et al. | |
| 2012/0303739 A1 | 11/2012 | Ferris | |
| 2012/0311128 A1 | 12/2012 | Pechanec et al. | |
| 2013/0067298 A1 | 3/2013 | Li et al. | |
| 2013/0085742 A1 | 4/2013 | Barker et al. | |
| 2013/0085989 A1 | 4/2013 | Nayyar et al. | |
| 2013/0152050 A1 | 6/2013 | Chang et al. | |
| 2013/0173546 A1* | 7/2013 | Cline | G06F 17/30575 707/638 |
| 2013/0173547 A1 | 7/2013 | Cline et al. | |
| 2013/0211559 A1 | 8/2013 | Lawson et al. | |
| 2013/0268643 A1 | 10/2013 | Chang et al. | |
| 2013/0268799 A1 | 10/2013 | Mestery et al. | |
| 2013/0268800 A1 | 10/2013 | Rangaiah | |
| 2013/0283364 A1 | 10/2013 | Chang et al. | |
| 2013/0297802 A1 | 11/2013 | Laribi et al. | |
| 2013/0311968 A1 | 11/2013 | Sharma | |
| 2013/0326028 A1 | 12/2013 | Cox et al. | |
| 2014/0007216 A1 | 1/2014 | Ahn | |
| 2014/0019961 A1 | 1/2014 | Neuse et al. | |
| 2014/0059559 A1 | 2/2014 | Alatorre et al. | |
| 2014/0075033 A1 | 3/2014 | Doering et al. | |
| 2014/0089809 A1 | 3/2014 | Levy et al. | |
| 2014/0109053 A1 | 4/2014 | Vasudevan et al. | |
| 2014/0172782 A1 | 6/2014 | Schuenzel et al. | |
| 2014/0195636 A1 | 7/2014 | Karve et al. | |
| 2014/0279890 A1 | 9/2014 | Srinivasan et al. | |
| 2014/0337429 A1 | 11/2014 | Asenjo et al. | |
| 2014/0344439 A1 | 11/2014 | Kempf et al. | |
| 2015/0019195 A1 | 1/2015 | Davis | |
| 2015/0019197 A1 | 1/2015 | Higginson et al. | |
| 2015/0019478 A1 | 1/2015 | Buehne et al. | |
| 2015/0019479 A1 | 1/2015 | Buehne et al. | |
| 2015/0019488 A1 | 1/2015 | Higginson et al. | |
| 2015/0019564 A1 | 1/2015 | Higginson et al. | |
| 2015/0019700 A1 | 1/2015 | Masterson et al. | |
| 2015/0019706 A1 | 1/2015 | Raghunathan et al. | |
| 2015/0019707 A1 | 1/2015 | Raghunathan et al. | |
| 2015/0020059 A1 | 1/2015 | Davis | |
| 2016/0364229 A1 | 12/2016 | Higginson et al. | |

FOREIGN PATENT DOCUMENTS

| | | |
|---|---|---|
| CN | 105308577 A | 2/2016 |
| CN | 105324756 A | 2/2016 |
| CN | 105324769 A | 2/2016 |
| CN | 105359102 A | 2/2016 |
| CN | 105359146 A | 2/2016 |
| CN | 105359147 A | 2/2016 |
| CN | 105393250 A | 3/2016 |
| CN | 105556515 | 5/2016 |
| CN | 105580032 | 5/2016 |
| EP | 2418591 | 2/2012 |
| EP | 3019958 | 5/2016 |
| EP | 3019961 | 5/2016 |
| EP | 3019962 | 5/2016 |
| EP | 3019975 | 5/2016 |
| EP | 3019976 | 5/2016 |
| EP | 3019979 | 5/2016 |
| EP | 3019980 | 5/2016 |
| EP | 3019981 | 5/2016 |
| EP | 3020010 | 5/2016 |
| GB | 2468742 | 9/2010 |
| JP | 2006277153 | 10/2006 |
| WO | 9952047 | 10/1999 |
| WO | 0153949 | 7/2001 |
| WO | 2015/005991 | 1/2015 |
| WO | 2015/005994 | 1/2015 |
| WO | 2015/006124 | 1/2015 |
| WO | 2015/006129 | 1/2015 |
| WO | 2015/006132 | 1/2015 |
| WO | 2015/006137 | 1/2015 |
| WO | 2015/006138 | 1/2015 |
| WO | 2015/006308 | 1/2015 |
| WO | 2015/006358 | 1/2015 |

OTHER PUBLICATIONS

Charles, Bug Severity vs. Priority, Quality Intelligence Blog, Retrieved on Aug. 4, 2014, from http://quality-intelligence.blogspot.com/2010/08/bug-severity-vs-priority.html, Aug. 22, 2010, 6 pages.

Das et al., Albatross: Lightweight elasticity in shared storage databases for the cloud using live data migration, 37th International Conference on Very Large Data Bases, Proceedings of the VLDB Endowment, vol. 4, No. 8, Retrieved from the Internet:URL:http://

(56) References Cited

OTHER PUBLICATIONS www.cs.ucsb.eduj-sudiptojpapers/albatross.pdf, Aug. 29, 2011, 12 pages.
International Application No. PCT/US2014/040486, International Search Report and Written Opinion mailed on Sep. 29, 2014, 11 pages.
International Application No. PCT/US2014/040692, International Search Report and Written Opinion mailed on Oct. 8, 2014, 8 pages.
International Application No. PCT/US2014/045247, International Search Report and Written Opinion mailed on Sep. 3, 2014, 8 pages.
International Application No. PCT/US2014/045282, International Search Report and Written Opinion mailed on Sep. 18, 2014, 12 pages.
U.S. Appl. No. 13/937,970, Non-Final Office Action mailed on May 5, 2015, 17 pages.
U.S. Appl. No. 13/937,977, Final Office Action mailed on Feb. 26, 2015, 30 pages.
U.S. Appl. No. 13/938,066, Notice of Allowance mailed on Apr. 29, 2015, 15 pages.
U.S. Appl. No. 13/937,344, Non-Final Office Action mailed on Sep. 24, 2015, 11 pages.
U.S. Appl. No. 13/937,483, Non-Final Office Action mailed on Sep. 25, 2015, 13 pages.
U.S. Appl. No. 13/937,977, Non-Final Office Action mailed on Aug. 19, 2015, 34 pages.
U.S. Appl. No. 13/938,066, Corrected Notice of Allowability mailed on Jun. 2, 2015, 2 pages.
International Application No. PCT/US2014/040486, Written Opinion mailed on Jun. 17, 2015, 7 pages.
International Application No. PCT/US2014/040692, Written Opinion mailed on Jul. 16, 2015, 7 pages.
Chanchary et al., Data Migration: Connecting Databases in the Cloud, ICCIT 2012, Saudi Arabia, retrieved from the Internet: <URL:http://www.chinacloud.cnjupload/2012-03/12033108076850.pdf>, Jun. 28, 2012, pp. 450-455.
Leite et al., Migratool: Towards a Web-Based Spatial Database Migration Tool, IEEE Computer Society, Proceedings of the 16th International Workshop on Database and Expert Systems Applications, Aug. 22, 2005, pp. 480-484.
Tao et al., Intelligent database placement in cloud environment, Web Services (ICWS), 2012 IEEE 19th International Conference, IEEE Computer Society, Jun. 24, 2012, pp. 544-551.
U.S. Appl. No. 13/938,066, Non-Final Office Action mailed on Dec. 17, 2014.
International Application No. PCT/US2014/045226, International Search Report and Written Opinion mailed on Oct. 30, 2014, 10 pages.
International Application No. PCT/US2014/045240, International Search Report and Written Opinion mailed on Oct. 21, 2014, 10 pages.
International Application No. PCT/US2014/045289, International Search Report and Written Opinion mailed on Oct. 15, 2014, 9 pages.
International Application No. PCT/US2014/045721, International Search Report and Written Opinion mailed on Nov. 4, 2014, 12 pages.
International Application No. PCT/US2014/045804, International Search Report and Written Opinion mailed on Nov. 17, 2014, 12 pages.
U.S. Appl. No. 13/937,344, Final Office Action mailed on Feb. 11, 2016, all pages.
U.S. Appl. No. 13/937,970, Final Office Action mailed on Dec. 10, 2015, all pages.
U.S. Appl. No. 13/937,486, Non-Final Office Action mailed on Jan. 11, 2016, all pages.
International Preliminary Report on Patentability of PCT/US2014/045247, mailed on Jan. 21, 2016, all pages.
International Preliminary Report on Patentability of PCT/US2014/045804, mailed on Jan. 21, 2016, all pages.
International Preliminary Report on Patentability of PCT/US2014/045721, mailed on Jan. 21, 2016, all pages.
International Preliminary Report on Patentability of PCT/US2014/045282, mailed on Jan. 21, 2016, all pages.
International Preliminary Report on Patentability of PCT/US2014/045289, mailed on Jan. 21, 2016, all pages.
International Preliminary Report on Patentability of PCT/US2014/045240, mailed on Jan. 21, 2016, all pages.
Notification of Transmittal of The International Preliminary Report on Patentability of PCT/US2014/040486, mailed on Oct. 1, 2015, all pages.
Notification of Transmittal of The International Preliminary Report on Patentability of PCT/US2014/040692, mailed on Oct. 8, 2015, all pages.
International Preliminary Report on Patentability of PCT/US2014/045226, mailed on Jan. 21, 2016, all pages.
U.S. Appl. No. 13/937,868, Non-Final Office Action mailed on Nov. 4, 2015, 18 pages.
To et al., Best Practices for Database Consolidation on Exadata Database Machine, Oracle, Oracle White Paper, 2011, 35 pages.
Vengurlekar et al., Best Practices for Database Consolidation in Private Clouds, Oracle, Oracle White Paper,, Mar. 2012, 29 pages.
U.S. Appl. No. 13/937,344, Corrected Notice of Allowability mailed on Sep. 15, 2016, 2 pages.
U.S. Appl. No. 13/937,483, Non-Final Office Action mailed on Aug. 12, 2016, 13 pages.
U.S. Appl. No. 13/937,885, Non-Final Office Action mailed on Aug. 18, 2016, 32 pages.
U.S. Appl. No. 13/937,977, Corrected Notice of Allowability mailed on Jul. 18, 2016, 2 pages.
U.S. Appl. No. 13/937,988, Non-Final Office Action mailed on Sep. 1, 2016, 10 pages.
U.S. Appl. No. 13/938,061, Non-Final Office Action mailed on Aug. 18, 2016, 29 pages.
U.S. Appl. No. 13/937,344, Notice of Allowance mailed on Oct. 11, 2016, 2 pages.
U.S. Appl. No. 13/937,486, Non-Final Office Action mailed on Nov. 4, 2016, 20 pages.
U.S. Appl. No. 13/937,970, Final Office Action mailed on Dec. 1, 2016, 22 pages.
Baysal, et al., "A Bug You Like: A Framework for Automated Assignment of Bugs", 2009.
U.S. Appl. No. 13/937,868, Final Office Action mailed on Apr. 22, 2016, all pages.
U.S. Appl. No. 13/937,483, Final Office Action mailed on Feb. 26, 2016, all pages.
U.S. Appl. No. 13/937,344, Notice of Allowance mailed on May 4, 2016, 11 pages.
U.S. Appl. No. 13/937,344, Notice of Allowance mailed on Jun. 6, 2016, 5 pages.
U.S. Appl. No. 13/937,483, Advisory Action mailed on May 12, 2016, 3 pages.
U.S. Appl. No. 13/937,486, Final Office Action mailed on Jul. 28, 2016, 18 pages.
U.S. Appl. No. 13/937,970, Non-Final Office Action mailed on May 12, 2016, 28 pages.
U.S. Appl. No. 13/937,977, Notice of Allowance mailed on Mar. 16, 2016, 18 pages.
U.S. Appl. No. 13/937,483, Notice of Allowance mailed on Jan. 20, 2017, 8 pages.
European Application No. 14745014.2, Office Action mailed on Jan. 18, 2017, 8 pages.
Chinese Application No. 201480035257.9, Office Action mailed on Apr. 6, 2017, 10 pages (5 pages for the original document and 5 pages for the English translation).
U.S. Appl. No. 13/937,483, Notice of Allowance mailed on May 3, 2017, 5 pages.
U.S. Appl. No. 13/937,970, Advisory Action mailed on Apr. 13, 2017, 3 pages.
U.S. Appl. No. 13/937,988, Notice of Allowance mailed on Apr. 27, 2017, 8 pages.
U.S. Appl. No. 13/937,885, Final Office Action mailed on May 19, 2017, 22 pages.

(56) References Cited

OTHER PUBLICATIONS

Chinese Application No. 201480035255.X, Office Action mailed on Feb. 27, 2017, 11 pages (5 pages for the original document and 6 pages for the English translation).
U.S. Appl. No. 13/938,061, Final Office Action mailed on Mar. 23, 2017, 29 pages.
U.S. Appl. No. 13/937,868, Non-Final Office Action mailed on Apr. 5, 2017, 23 pages.

* cited by examiner

ONLINE DATABASE MIGRATION

CROSS REFERENCES TO RELATED APPLICATIONS

The present application is related to the following co-pending and commonly assigned U.S. Patent Applications: U.S. patent application Ser. No. 13/937,545 filed concurrent herewith by Higginson and entitled "METHOD AND SYSTEM FOR REDUCING INSTABILITY WHEN UPGRADING SOFTWARE;" U.S. patent application Ser. No. 13/938,061 filed concurrent herewith by Davis and entitled "CONSOLIDATION PLANNING SERVICES FOR SYSTEMS MIGRATION;" U.S. patent application Ser. No. 13/938,066 filed concurrent herewith by Davis and entitled "MIGRATION SERVICES FOR SYSTEMS;" U.S. patent application Ser. No. 13/937,885 filed concurrent herewith by Higginson and entitled "DATABASE MODELING AND ANALYSIS;" U.S. patent application Ser. No. 13/937,868 filed concurrent herewith by Higginson and entitled "AUTOMATED DATABASE MIGRATION ARCHITECTURE;" U.S. patent application Ser. No. 13/937,344 filed concurrent herewith by Raghunathan et al. and entitled "CLOUD SERVICES LOAD TESTING AND ANALYSIS;" U.S. patent application Ser. No. 13/937,483 filed concurrent herewith by Raghunathan et al. and entitled "CLOUD SERVICES PERFORMANCE TUNING AND BENCHMARKING;" U.S. patent application Ser. No. 13/937,988 filed concurrent herewith by Buehne et al. and entitled "SOLUTION TO GENERATE A SCRIPTSET FOR AN AUTOMATED DATABASE MIGRATION;" U.S. patent application Ser. No. 13/937,486 filed concurrent herewith by Buehne et al. and entitled "DYNAMIC MIGRATION SCRIPT MANAGEMENT;" and U.S. patent application Ser. No. 13/937,970 filed concurrent herewith by Masterson et al. and entitled "ADVANCED CUSTOMER SUPPORT SERVICES—ADVANCED SUPPORT CLOUD PORTAL."

The entire disclosure of each of these Applications is incorporated herein by reference for all purposes.

BACKGROUND

Upgrading or otherwise migrating a complex database system can be daunting. Complex database systems are typically maintained by corporations, governments, and other large-scale entities (collectively referred to as customers) that have a limited ability to tolerate systems being offline. As such, when mission-critical database systems are to be migrated from a first server system to a second (likely newer and more advanced) server system, a customer may desire an efficient and timely migration.

In many conventional arrangements, when a migration is to be performed from a source server system to a target server system, the source server system is taken offline, the migration between the server systems is performed, and then the target server system is brought online. However, such a migration may result in a significant amount of time during which neither the source server system nor target server system is online. A customer may desire to decrease, as much as possible, the amount of time during which both the source server system and the target server system are offline.

SUMMARY

Various arrangements for performing an online migration are presented. In some embodiments, a method for performing an online migration between server systems is presented. The method may include initiating transfer, from a source server system to a target server system, of a database object, wherein the source server system is online during transfer of the database object. The method may include recording, by the source server system, a chronological indication of when transfer of the database object was initiated. The method may include, while transferring the database object, receiving, by the source server system, a plurality of change requests for a plurality of records of the database object. The method may include storing, by the source server system, the plurality of change requests and, for each change request of the plurality of change requests, a chronological indication of when the change request was received. The method may include, after storing the plurality of change requests, completing transfer, from the source server system to the target server system, of the database object. The method may include, after transferring the database object to the target server system, applying the plurality of change requests to the database object stored by the target server system while the source server system is online.

Embodiments of such a method may include one or more of the following features: Chronological indications may be numbers assigned chronologically to database transactions performed by the source server system. Applying the plurality of change requests to the database object stored by the target server system while the source server system is online may include: accessing the chronological indication indicative of when transfer of the database object was initiated; and determining to apply each change request of the plurality of change requests to the database object as stored by the target server system based on each chronological indication of when the change request was processed by the source server system as compared to the chronological indication indicative of when transfer of the database object initiated. Applying the plurality of change requests to the database object stored by the target server system while the source server system is online may include: ignoring a change request based on a chronological indication of the change request indicating an earlier time than the chronological indication indicative of when transfer of the database object to the source server system was initiated. The method may include after transferring the database object to the target server system and applying the plurality of change requests to the database object stored by the target server system while the source server system is online, causing the source server system to go offline such that the source server system does not respond to database requests. The method may include, after causing the source server system to go offline, causing the target server system to go online such that the target server system responds to database requests. The method may include, while transferring the database object, receiving an increase in a number of migration scripts to run in parallel by the source server system. The method may include, in response to the increase in the number of migration scripts, initiating, by the source server system, transfer of a second database object to the target server system. The method may include, while transferring the database object and in response to the plurality of change requests to records of the database object, updating, by the source server system, the database object as stored by the source server system. The database object transferred to the target server system may match the database object stored by the source server system when transfer of the database object was initiated.

In some embodiments, a system for performing an online migration between server systems is presented. The system may include a source server system. The source server system may be configured to initiate a transfer, to a target server system, of a database object, wherein the source server system is online during transfer of the database object. The source server system may be configured to record a chronological indication of when transfer of the database object was initiated. The source server system may be configured to, while transferring the database object, receive a plurality of change requests for a plurality of records of the database object. The source server system may be configured to store the plurality of change requests and, for each change request of the plurality of change requests, a chronological indication of when the change request was received. The source server system may be configured to, after storing the plurality of change requests, completing transfer of the database object to the target server system. The system may include a target server system. The target server system may be configured to, after receiving the database object, apply the plurality of change requests to the database object stored by the target server system while the source server system is online.

Embodiments of such a system may include one or more of the following features: Chronological indications can be numbers that are assigned chronologically to database transactions performed by the source server system. The target server system being configured to apply the plurality of change requests to the database object stored by the target server system while the source server system is online may include the target server system being configured to: access the chronological indication indicative of when transfer of the database object was initiated; and determine to apply each change request of the plurality of change requests to the database object as stored by the target server system based on each chronological indication of when the change request was processed by the source server system as compared to the chronological indication indicative of when transfer of the database object initiated. The target server system being configured to apply the plurality of change requests to the database object stored by the target server system while the source server system is online may include the target server system being configured to: ignore a change request based on a chronological indication of the change request indicating an earlier time than the chronological indication indicative of when transfer of the database object to the source server system was initiated. After transferring the database object to the target server system and applying the plurality of change requests to the database object stored by the target server system while the source server system is online, the source server system may be configured to go offline such that the source server system does not respond to database requests. After the source server system is offline, the target server system may be configured to go online such that the target server system responds to database requests. The source server system may be further configured to receive an increase in a number of migration scripts to run in parallel. In response to the increase in the number of migration scripts, the source server system may be configured to initiate transfer of a second database object to the target server system. The source server system may be configured to, while transferring the database object and in response to the plurality of change requests to records of the database object, update the database object as stored by the source server system.

In some embodiments, an apparatus for performing an online migration between database systems is presented. The apparatus may include means for initiating a transfer, from a source database system to a target database system, of a database object, wherein the source database system is online during transfer of the database object. The apparatus may include means for recording a chronological indication of when transfer of the database object was initiated. The apparatus may include means for receiving a plurality of change requests for a plurality of records of the database object while transferring the database object. The apparatus may include means for storing the plurality of change requests and, for each change request of the plurality of change requests, a chronological indication of when the change request was received. The apparatus may include means for completing transfer, from the source database system to the target database system, of the database object. The apparatus may include means for applying the plurality of change requests to the database object stored by the target database system after transferring the database object and while the source database system is online.

Embodiments of such an apparatus may include one or more of the following: Chronological indications may be numbers assigned chronologically to database transactions performed by the source database system. The means for applying the plurality of change requests to the database object stored by the target database system while the source database system is online may include: means for accessing the chronological indication indicative of when transfer of the database object was initiated; and means for determining to apply each change request of the plurality of change requests to the database object as stored by the target database system based on each chronological indication of when the change request was processed by the source database system as compared to the chronological indication indicative of when transfer of the database object initiated. Applying the plurality of change requests to the database object stored by the target database system while the source database system is online may include: means for ignoring a change request based on a chronological indication of the change request indicating an earlier time than the chronological indication indicative of when transfer of the database object to the source database system was initiated. The apparatus may include means for causing the source database system to go offline such that the source database system does not respond to database requests after transferring the database object to the target database system and applying the plurality of change requests to the database object stored by the target database system while the source database system is online. The apparatus may include means for causing the target database system to go online such that the target database system responds to database requests after causing the source database system to go offline.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
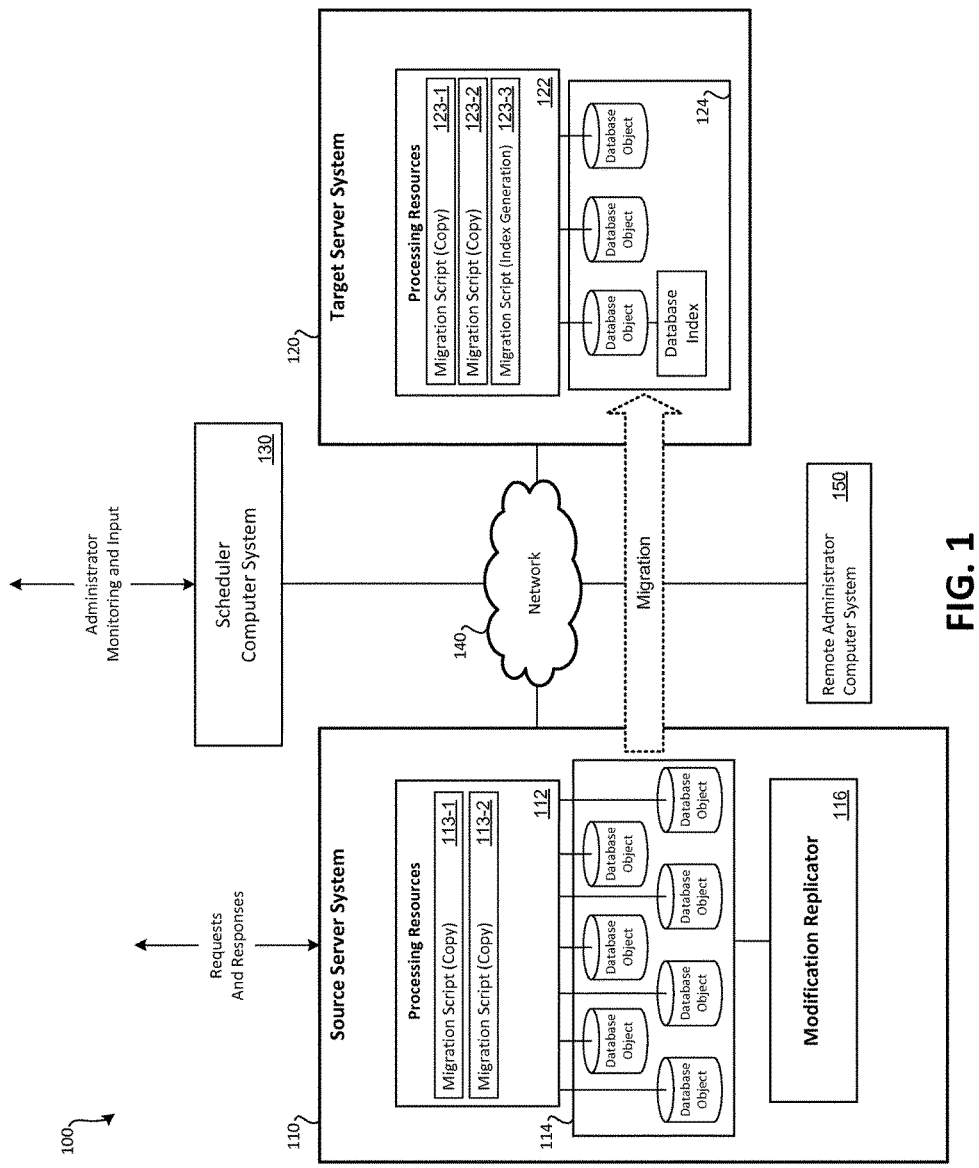
FIG. 1 illustrates an embodiment of a system configured to perform an online migration between server systems.

Rather than having a source server system offline while a migration is being performed, the source server system may be kept online such that the source server system is responding to database requests while migration functions are being performed. While online, the source server system may receive and respond to read requests for records stored in one or more databases maintained by the source server system. The source server system may also receive and respond to modification requests for records stored in the one or more databases maintained by the source server system. In order for the source server system to fulfill database requests in a timely fashion, the number of migration scripts performed concurrently by the source server system may be smaller than the number of migration scripts that would be executed concurrently if the source server system was offline. As such, performing scripts related to the migration may take significantly longer while the source server system is online; however, this arrangement may be tolerable to the customer operating the source server system because the databases of the source server system remain online during the migration.

A "source server system" may refer to a grouping of one or more computer systems that stores and executes a database installation. The source server system may fulfill retrieval, update, and other forms of database queries. A "migration" may refer to moving or copying the database installation to a target server system from the source server system. Therefore, prior to migration, the database installation may only be available on the source server system. Following the migration, the database installation may be present on the target server system and, possibly, still present on the source server system. The "target server system" may refer to a grouping of one or more computer systems that stores the database installation after the migration. The target server system may execute the database installation and fulfill retrieval, update, and other forms of database queries following the migration. Following a successful migration, the source server system may be taken offline (such that the source server system does not receive and/or respond to database requests) and the target server system may be brought online. Therefore, following the migration, the source server system being taken offline, and the target server system being brought online, the target server system fulfills database requests instead of the source server system.

A migration can involve multiple types of steps. First, tables of databases and associated data storage arrangements (collectively referred to as "database objects") may need to be copied from the source server system to the target server system. These copy functions may be performed while the source server system is online. Such databases and associated data storage arrangements may range from small to enormous (e.g., hundreds of gigabytes, hundreds of terabytes). Various scripts may be created that are configured to efficiently copy a database object from the source server system to the target server system. A scheduler system may manage execution of these migration scripts, select an order for their configuration, and manage how many of these migration scripts are executed in parallel.

If the source server system is online while migration copy scripts are being executed by the source server system to copy database objects to the target server system, database requests received by the source server system may result in a database object being copied to the target server system being modified. The database object may be copied to the target server system as the database object is stored by the source server system at the initialization of the copy. Therefore, modifications to the database object that are processed after initialization of the copy may not be reflected in the initial version of the database object copied to the target server system. A modification replicator, which may be software running at the source server system, may log modifications made to the databases managed by the source server system during the migration. Each modification may be assigned a chronological identifier. Further, the initialization of the copy of a database may be assigned a chronological identifier. Therefore, based on the chronological identifier of the modifications and the chronological identifier of the initialization of the copy of the database, it can be determined which logged modifications will need to be propagated to the copy of the database copied to the target server system.

After a database has been copied from the source server system to the target server system, one or more indexes may be generated for the database copied to the target server system. Such indexes may allow for faster and/or more efficient querying of the database at the target server system. Rather than copying previously-created index files from the source server system to the target server system, it may be more efficient to ignore the index files of the source server system and have the target server system generate its own index files. Therefore, while the source server system remains online, the target server system, which is not yet online, can create index files for one or more databases copied to the target server system.

Third, after one or more databases have been copied to the target server system (e.g., copying of all database objects from the source server system to the target server system is complete), a customer may desire at least some level of verification to be performed on the databases at the target server system to ensure the copy was performed correctly and/or fully. Such a verification may be performed once the source server system is taken offline and all modifications made to database objects at the source server system have been propagated to the database objects stored by the target server system. In some embodiments, a row count of the copied database as stored by the target server system is compared with a row count of the corresponding database as stored by the source server system. If the row counts match, the customer can be at least assured that at least it appears no records were lost during the migration. In some embodiments, a record-by-record comparison may be made; however this process may be time consuming and may be undesirable if both the source server system and target server system are offline.

While some of these functions are dependent on other functions, some functions may be performed in parallel. As an example of a dependent function, index generation for a database to be performed by the target server system may only be performed once the copy of the database to the target server system from the source server system has been completed. However, the copying and index generation of a first database may be performed independently of the copying and index generation of a second database. As such, at least some functions to be performed during a migration may be performed in parallel.

In summary, during a migration, at least three major functions may be performed: a copy function, an index generation function, and a verification function. However, it should be understood that in some embodiments, a function may be omitted, such as the verification function. In an online migration, during at least the copy and index generation functions, the source server system may be online. Therefore, the total amount of time in which the source server system and the target server system are offline at the same time may be very small, especially when compared to the amount of time that both the source server system and the target server system would be offline during an offline migration. During the online migration, once the source server system has been taken offline, verification of one or more databases may be performed. Once the customer operating the source server system is satisfied with the verification, the target server system may be brought online.

FIG. 1 illustrates an embodiment of a system 100 configured to perform an online migration between server systems. System 100 may include source server system 110, target server system 120, scheduler computer system 130, network 140, and remote administrator computer system 150.

Source server system 110 may represent one or more computer systems. Source server system 110 may store and execute a database installation. Source server system 110 may fulfill retrieval, update/modification, and other forms of database queries and functions. Prior to migration, the database installation may be available on the source server system but not target server system 120. Source server system 110 may include processing resources 112 and storage resources 114. Processing resources 112 may include one or more processors configured to execute multiple processes simultaneously. For example, processing resources 112 are illustrated as executing two migration scripts simultaneously: migration script 113-1 and migration script 113-2. Migration scripts 113 executed by processing resources 112 may be copy scripts configured to copy a database or other storage arrangement from source server system 110 to target server system 120. Execution of migration scripts 113 may be initiated by another system accessible via network 140.

Source server system 110 may have storage resources 114 which may represent one or more (non-transitory) computer-readable storage mediums (e.g., hard drives, solid-state drives) which store databases, indexes, and/or other forms of database objects. Some database objects may be copied to target server system 120 as part of a database migration. Typically, a database installation at a source server system 110 may include a large number (e.g., hundreds, thousands, millions) of database objects which may consume a large amount of storage resources. As such, a copy of some database objects from source server system 110 to target server system 120 may take a significant amount of time to perform. In some embodiments, database objects which are databases are copied from source server system 110 to target server system 120, but database objects such as indexes are not.

In the illustrated embodiment of source server system 110, two migration scripts are being executed by source server system 110. Migration scripts 113 may each result in a particular database object being copied from storage resources 114 to target server system 120. This migration of the database objects is represented by the dotted migration arrow. Migration scripts 113 performed by source server system 110 may be performed in parallel. Since an online migration is being performed, source server system 110 may be required to respond to database requests in a timely manner. As such, an administrator managing the migration may ensure that a certain amount of percentage of processing resources 112 of source server system 110 is reserved for handling database requests. Further, the rate at which copy functions are performed by source server system 110 may be throttled in order to preserve bandwidth for responding to database requests. For instance, migration script 113-1 may be restricted to copying at a particular speed such that database requests can be fulfilled by source server system 110 without a significant delay compared to fulfillment of database requests when a migration is not being performed. A database administrator in conjunction with the customer may determine what constitutes an acceptable level of delay in source server system 110 responding to database requests. Based on the determined acceptable level of delay, the database administrator may increase or decrease the number of migration scripts being executed by source server system 110 in order to not exceed the determined acceptable level of delay.

Since an online migration is being performed from source server system 110 to target server system 120, source server system 110 may need to modify records of one or more databases from among the stored database objects while the migration is ongoing. For instance, while a particular database is being copied from storage resources 114 of source server system 110 to storage resources 124 of target server system 120, one or more requests may be received by source server system 110 to modify one or more records of the database. Further, such requests for modification may be received after the database has been copied to target server system 120 but before target server system 120 has been brought online. Modification replicator 116 may log modifications made to database objects of source server system 110. For each modification logged, a chronological identifier may be assigned to the modification. Further, such chronological identifiers may be assigned at initialization of the copy of a database object from source server system 110 to target server system 120. Therefore, modification replicator 116 may be able to identify modifications (also referred to as updates) that have been made to a database object at source server system 110 but not yet at target server system 120. Further detail of modification replicator 116 is provided in reference to FIG. 3.

Target server system 120 may represent one or more computer systems. Target server system 120 may store and execute a database installation after the migration is complete. Target server system 120 may remain offline after the migration is complete until a database administrator configures target server system 120 to function online. Typically, target server system 120 may be a faster, newer group of one or more computer systems than source server system 110 (which may be why the migration is being performed). After the migration, source server system 110 may be intended to fulfill retrieval, update, and other forms of database queries. Prior to migration, the database installation may be available on the source server system but not target server system 120. Following migration, the database installation may be available on target server system 120. Target server system 120 may include processing resources 122 and storage resources 124. Processing resources 122 may include one or more processors configured to execute multiple processes simultaneously. For example, processing resources 122 are illustrated as executing three migration scripts simultaneously: migration script 123-1, migration script 123-2, and migration script 123-3. Migration scripts 123 executed by processing resources 122 may be copy scripts configured to receive a database or other storage arrangement from source server system 110 for storage by target server system 120. As such, migration script 113-1 may cause a database object to be copied from source server system 110 while migration script 123-1 serves to receive and create a corresponding database object at target server system 120.

Based on the configuration of the scheduler system and/or of the migration scripts, one or more database objects copied to the target server system may be modified as compared to the same database object as stored by the source server system. For example, the created database object at the target server system may be compressed, while the corresponding database object stored by source server system 110 was uncompressed. In some embodiments, one or more database objects as stored by target server system 120 may be structured differently (e.g., reorganized) than the corresponding database object stored by source server system 110.

Processing resources 122 of target server system 120 may execute migration scripts that cause index generation. An index may allow a database stored by target server system to be accessed more efficiently (e.g., on the basis of time and/or usage of processing resources). Once a database has been copied from source server system 110 to target server system 120, an index may be created for the database. Such index generation may be performed while source server system 110 is online. As such, only certain database objects may be copied from source server system 110 to target server system 120, such as databases. Other forms of database objects, such as database indexes, may be created by the target server system 120 rather than be copied from source server system 110. In the illustrated embodiment of system 100, target server system 120 is executing a migration script 123-3 that is creating an index file for a database stored by storage resources.

Storage resources 124 may represent one or more (non-transitory) computer-readable storage mediums of target server system 120, such as hard drives and solid state drives. Storage resources 124 may store databases and other database objects copied from storage resources 114 of source server system 110. Storage resources 124 may additionally store database objects, such as a database indexes, created by target server system 120.

Additionally, processing resources 122 may perform migration verification scripts that confirm that copied database objects stored by target server system 120 match the source database object stored by source server system 110. Such a verification migration script may involve a row count being performed on both database objects to determine if the counts match (individual data element comparisons may not be performed). Verification scripts may be performed once source server system 110 is brought offline and all modifications made to records of database objects maintained by source server system 110 have been replicated in the corresponding database object of target server system 120. Migration scripts 123 performed by target server system 120 may be performed in parallel.

Network 140 may include one or more networks that can be used for communication between source server system 110 and target server system 120. Network 140 may include one or more public networks, such as the Internet and/or one or more private networks such as a corporate intranet. In some embodiments, a direct connection may be present between source server system 110 and target server system 120 to facilitate faster data transfers. Network 140 may also permit communication between source server system 110, target server system 120, a scheduler computer system 130, and remote administrator computer system 150. Requests and responses handled by source server system 110 may occur via network 140.

Scheduler computer system 130 may represent a computer system separate from source server system 110 and target server system 120. Alternatively, functions of scheduler computer system 130 may be performed by either source server system 110 or target server system 120. For example, in some embodiments, a scheduler may be executed by target server system 120. Scheduler computer system 130 may be configured to control when migration scripts are executed by source server system 110 and target server system 120. Given a listing of migration scripts to be executed, scheduler computer system 130 may be configured to determine an order of execution to optimize the migration from source server system 110 to target server system 120. Scheduler computer system 130 may be configured to query source server system 110 and/or target server system 120 to determine the amount of processing resources available at each server system. Based on an assessment of processing resources available, the number of and/or which migration scripts that are executed by source server system 110 and/or target server system 120 may be varied.

In some embodiments, a database administrator who is managing the migration may provide input directly to scheduler computer system 130. Such input may occur during the migration; therefore, the database administrator may be able to modify characteristics of the migration process while the migration is in progress. The database administrator may be permitted to define particular parameters that govern scheduler computer system 130. For instance, the database administrator may define a maximum number of migration scripts which can be executed simultaneously by source server system 110 and/or target server system 120. In other embodiments, rather than the database administrator providing input directly to scheduler computer system 130, the database administrator may use remote administrator computer system 150 to provide input to scheduler computer system 130. Therefore, an administrator may be able to perform the migration in a cloud-based arrangement. The scheduler computer system 130 and/or remote administrator computer system 150 may be remotely located from source server system 110 and/or target server system 120. Therefore, a database administrator, who may be hired on a contract basis, such as from the company that developed the database software and/or hardware for source server system 110 and/or target server system 120, may be able to perform a cloud-based migration of the database installation from source server system 110 to target server system 120.

Figure 2:
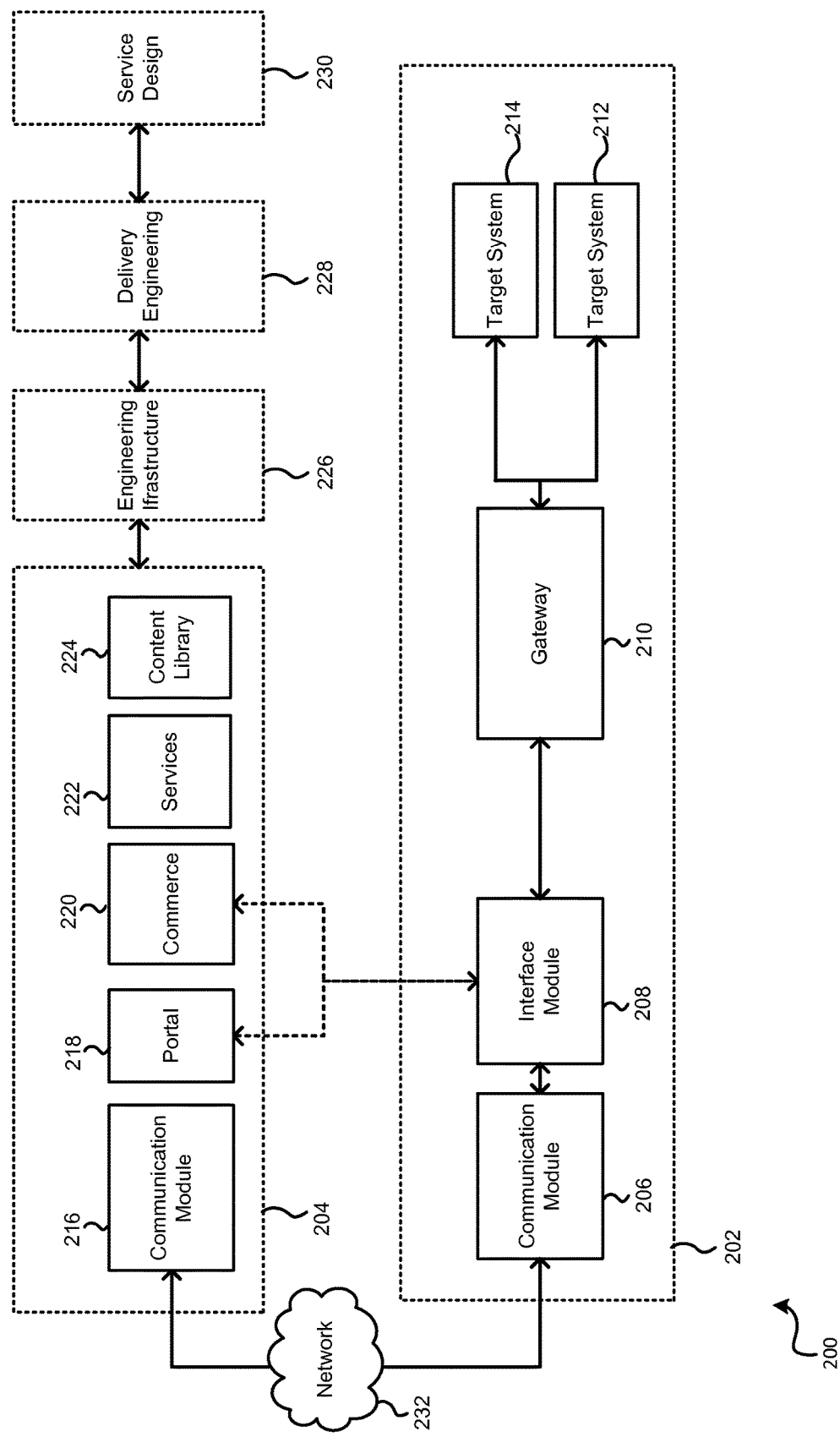
FIG. 2 illustrates an embodiment of a support cloud platform.

FIG. 2 illustrates an embodiment of a support cloud platform 200. The platform may be used to implement a service, such as a migration from a customer's source server system to the customer's target server system. Services may be designed, made available for deployment, deployed to a customer, and monitored using the platform. The customer data center 202 may include one or more target systems 212, 214 (one of which may be the customer's source server system, the other being the customer's target server system) that may be the target(s) of the services provided by the platform. The target systems may be servers, computers, rack systems, and the like that run or execute a database and/or other database software used by a customer. A target system may be a hardware or software entity that can have service delivered and may be a host, database, web logic service, and/or the like. In the customer data center 202, the target systems 212, 214 may be managed by an administrator local to the customer data center 202. The administrator may have physical access to the target systems 212, 214. The support cloud platform 200 may provide for the administration and other services of the target systems via a remote interface from a remote location. As such, support cloud platform 200 may serve as a platform for how remote administrator computer system 150 of FIG. 1 interacts with the migration from source server system 110 to target server system 120. A gateway 210, located on the customer data center 202 provides remote access to the customer data center 202 and one or more target systems 212, 214. The gateway 210 may be a hardware or virtual software appliance installed at the customer data center. The gateway 210 connects to a production cloud 204 of a service provider via a secure connection using a communication module 206 over a network 232 (which may represent network 140 of FIG. 1). The gateway 210 may optionally have an interface module 208 allowing control of the interactions of gateway 210 to the production cloud 204 of the service provider.

Services may be generated and developed using a common service development framework of the platform. The common service development framework may include a service design 230, delivery engineering 228, and engineering infrastructure 226 modules. The common service development framework may leverage common components that can be used throughout the delivery process (manual and/or automated), and may enable the efficient design, development, testing and release of a service. The common service development framework of the platform enables at least partial automation of the development of a service.

The platform enables delivery engineers to automate the service they are developing and implementing. In some embodiments, the development of services may be automated or simplified with the use of reusable components. For example, many of the same deployment, execution, and error handling functions used in the services may be designed as reusable components. The components may be reused in many services allowing the design and coding of the service to be focused on the new core functionality of the service. Using the platform, services may be designed and implemented in one or more central locations. A centralized service design and development platform enables a hierarchical and structured service design with reusable components and modules. The development of a service may be, at least in part, automated since a large portion of the components of a service may be assembled from existing reusable components.

After the services are designed, developed, and tested, they may be stored at the production cloud 204. For example, a service may include modification replicator 116 of FIG. 1, which may be installed at the source server system of the customer ahead of an online migration. Similarly, the functionality of scheduler computer system 130 of FIG. 1 may be implemented as a service that is deployed from production cloud 204. The production cloud 204 may include a library of services 222 and a content library 224. The services and content may be deployed from the production cloud 204 to one or more target systems 212, 214 at a customer data center 202. The deployment, monitoring, and the like of services may be arranged with interaction from the portal 218 and commerce module 220 at the production cloud 204 and the gateway 210 and an interface module 208 at the customer data center 202 via the communication modules 206, 216. The design, deployment and monitoring of the service may be performed remotely from production cloud 204 without the need of an administrator or engineer at the customer data center 202. The portal 218 of the platform may provide for remote control and administration of services, control of deployment, and analysis of results.

The platform of FIG. 2 may be used to develop, deploy and manage services for the customer data center 202 and target systems 212, 214. A gateway 210 has access to the target systems 212, 214. Services, in the forms of software, scripts, functions, and the like, may be downloaded from the production cloud 204. The commerce module 220 and the portal for the production cloud 204 provide an interface, selection tools, monitoring tools, for selecting the services, and monitoring the services to be deployed in the customer data center 202. An administrator at the customer data center 202 may view, select, and monitor the services using the portal 218 and commerce module 220. The customer may access the portal 218 and commerce module 220 using interface module 208 at the customer data center 202. The interface module may have a direct or an indirect access to the portal 218 and the commerce module via the communication module 206. For example, using the support cloud platform 200, a service may be selected using the commerce module 220. The commerce module 220 may be accessed using the interface module 208. Once a service is selected and configured for the target systems 212, 214, the service may be deployed from the production cloud 204 to the customer data center 202 via the gateway 210. The gateway may deploy the service on to the target systems. The gateway 210 may be used to gather data statistics, monitor services, and receive system information about the customer data center and the target systems. The data may be processed, analyzed, and transmitted to the production cloud. The data may be used to suggest or deploy services to the customer, present statistics or metrics of the customer's target servers using the portal 218. Therefore, without an administrator coming to the customer's site to access the source server system and target server system in person, an administrator may be able to perform a migration from the source server system to the target server system.

Figure 3:
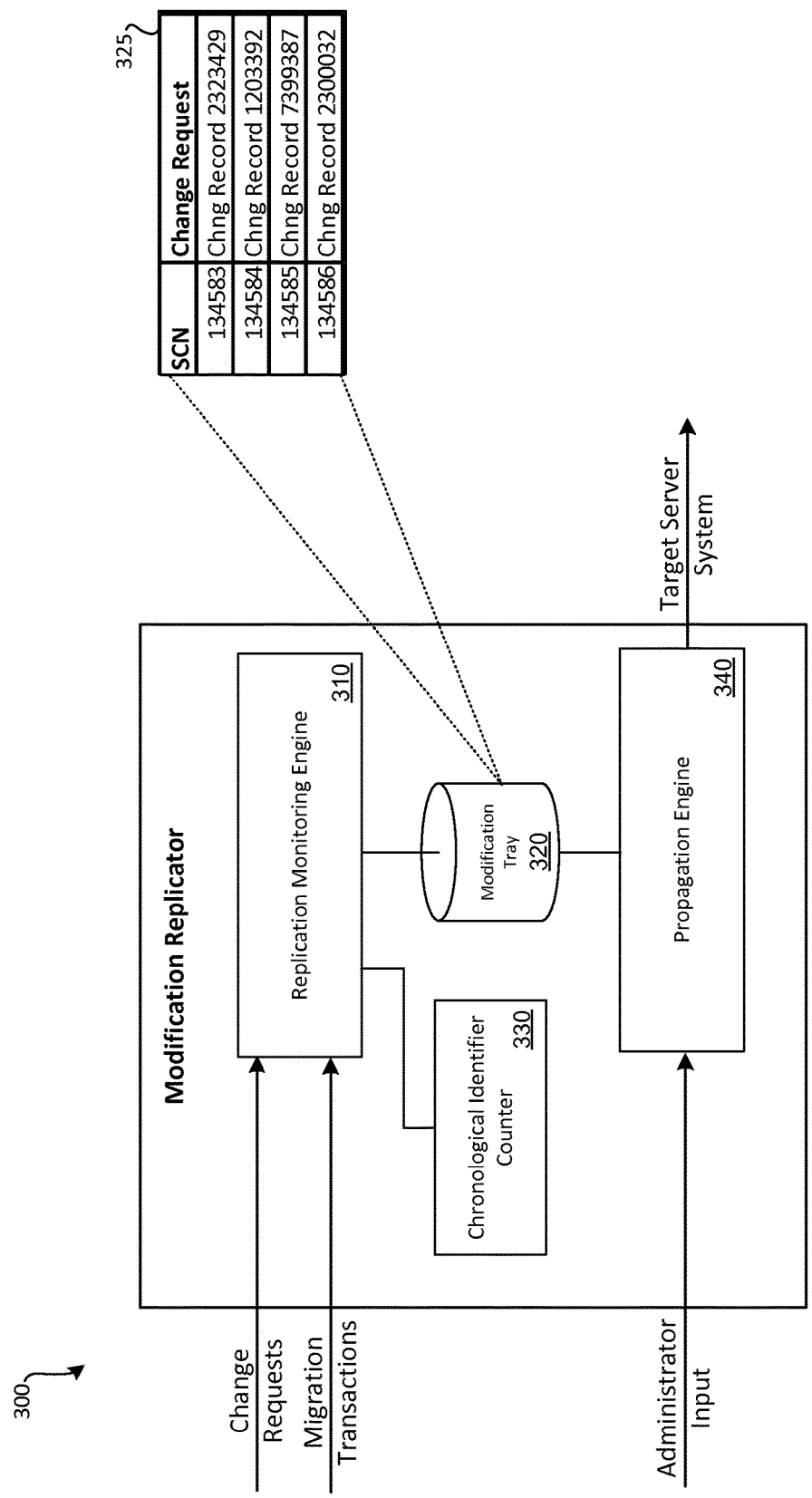
FIG. 3 illustrates an embodiment of a modification replicator.

FIG. 3 illustrates an embodiment of a modification replicator 300. Modification replicator 300 may represent modification replicator 116 of FIG. 1 or may represent some other implementation of a modification replicator. Modification replicator 300 may serve to monitor changes made to (and, possibly, other transactions related to) database objects processed by a source server system, such as source server system 110 of FIG. 1. Further, modification replicator 300 may propagate these changes to the corresponding database objects that are copied to but have yet to be brought online at a target server system, such as target server system 120 of FIG. 1. Modification replicator 300 may be implemented as software, firmware, and/or specialized hardware. In many embodiments, modification replicator 300 is software that is installed on and executed by a source server system. For instance, modification replicator 300 may be installed on a source server system ahead of when an online migration is going to be performed. Modification replicator 300 may include various components. Each of these components may be implemented as software (executed by general-purpose computer system components, such as computer system 700 of FIG. 7), firmware, and/or specialized computer hardware. Further, functionality of individual components of modification replicator 300 may be combined into fewer components or divided into more components. Modification replicator 300 may include: replication monitoring engine 310, modification tray 320, chronological identifier counter 330, and propagation engine 340.

Replication monitoring engine 310 may receive change requests that are being implemented in database objects (e.g., tables) maintained by a source server system. Therefore, whenever a record of the database is to be modified by the source server system, replication monitoring engine 310 may receive a copy of the change request being implemented. In some embodiments, requests that do not result in a change to a database object may not be received and/or stored by replication monitoring engine 310. For example, a read request for a record of the database maintained by the source server system may not be stored by replication monitoring engine 310. For change requests fulfilled by source server system, the change performed may be logged by replication monitoring engine 310 in modification tray 320. Replication monitoring engine 310 may assign to the change request a chronological identifier, which may be produced by chronological identifier counter 330. Therefore, a modification request received by replication monitoring engine 310 may be recorded to modification tray 320 with a chronological identifier provided by chronological identifier counter 330.

Modification tray 320 may store modifications made to records of one or more database objects maintained by the source server system. When a change request is stored to modification tray 320, this change request may have already been made or may be in the process of being made to the corresponding database object maintained by the source server system. Therefore, change requests recorded to modification tray 320 are implemented at the source server system. Sample tray section 325 provides a simplified example of four entries which may be present in modification tray 320 based on change requests received and processed by the source server system. A chronological identifier, which may be a system change number (SCN) provided by chronological identifier counter 330, may be linked to a change request. Each change request may specify a database, a record, and/or a field to be changed. Further, the change request may indicate the value to which the field of the record is to be changed. Other forms of change requests may be possible including addition of a new record, and deletion of a record, or some other form of change request. It may be possible to record each type of change request to modification tray 320. It should be understood that sample tray section 325 is greatly simplified; each change request indicated may have significantly more data present in order to properly indicate the appropriate database, record of the database, and/or field of the record to be changed, and the change to be made to that database, record of the database, and/or field of the record.

Chronological identifier counter 330 may be configured to assign chronological identifiers to each change performed to databases of a source server system. In some embodiments, chronological identifier counter 330 may receive an indication of when a change is being made to the database from replication monitoring engine 310. In some embodiments, in response, chronological identifier counter 330 outputs a system change number (SCN), which may be assigned chronologically. Each SCN is chronologically assigned. For example, a first change made to a database of a source server system may be assigned an SCN of 1, the second change made to the same or a different database of the source server system may be assigned an SCN of 2. Therefore, SCNs are chronologically assigned; however it may not be possible to identify an amount of time that elapses between assignments of SCNs. For example, 1 millisecond or 3 minutes may have elapsed between SCN 1 and SCN 2 being assigned to changes. In some embodiments, chronological identifier counter 330 may use a form of timestamp in place of SCNs.

In addition to assigning SCNs to change requests received and processed by the source server system, an SCN may be assigned (or otherwise logged) when a copy of a database object from the source server system to the target server system is initiated. Therefore, since SCNs are assigned chronologically, it can be determined which changes, if relevant to the database being copied, were implemented in the database object before the copy was initiated. Change requests stored by modification tray 320 that affect the database object with a chronologically later (e.g., higher) SCN than the SCN indicative of when the copy of the database object from the source server system to the target server system was initiated indicates that the change request will need to be propagated to the target server system to update the database object as stored by the target server system. Change requests that affect the database object with a chronologically earlier (e.g., lower) SCN than the SCN indicative of when the copy of the database object from the source server system to the target server system was initiated indicates that the change request will not need to be propagated to the target server system at a later time because the change has already been implemented in the version of the database object copied to the target server system.

Copying a database object from a source server system to a target server system may take a significant amount of time. For example, the database object may be many hundreds of gigabytes or terabytes in size. The size, compounded with a limited amount of bandwidth available between the source server system and the target server system and the source server system being online may result in the copying requiring many minutes, hours, or even days to complete. Therefore, while the copy of the database object is in progress, a large number of change requests to that database object may be received and processed by the source server system. The database object stored by the source server system may be modified in accordance with the change requests while the copy is in progress. However, the database object may be copied to the target server system based on the content of the database object at the time the copy was initialized. As such, when the copy is initialized, this version of the database stored by the source server system serves as the snapshot of the database object to be copied to the target server system. Based on the SCNs stored with each change made to records of the database during the copy, a version of each record as stored by the source server system at the time of initialization of the copy will be transferred to the target server system, rather than the version of the record modified in accordance with the change request processed after initialization of the copy. While the "old" version of the record will be copied during the initial transfer of the database object to the target server system, the record will be updated in accordance with the change request at some time after the initial transfer of the database object being fully copied.

It may be possible that copying the database object from the source server system to the target server system takes a long enough period of time that the value of one or more fields of one or more records at the time the copy was initiated is no longer available. In such situations, the copy of the database object from the source server system to the target server system may be restarted and, possibly, attempted to be completed faster (to decrease the likelihood of such an issue reoccurring). To complete the copy faster, the number of migration scripts being processed in parallel by the source server system may be decreased, the amount of communication bandwidth available between the source server system and the target server system may be increased, and/or response time to requests received by the online source server system may be increased.

After a database object has been copied from the source server system to the target server system, the target server system may have a version of the database object that is only current through when the copy was initiated. Therefore, many change requests recorded to modification tray 320 may need to be used to update the version of the database object stored by the target server system in order to bring the database object stored by the target server system up to current (and match the corresponding database object stored by the source server system). Propagation engine 340, upon receiving input from an administrator and/or from a scheduler computer system, may propagate change requests stored by modification tray 320 to the database object as stored by the target server system. To propagate changes to the database stored by the target server system, propagation engine 340 may inspect the SCN corresponding to initialization of the copy of the database object (which may have been logged in modification tray 320 or in some other location, such as by a scheduler computer system). All change requests stored by modification tray 320 having an earlier SCN than the SCN corresponding to initialization of the copy may be disregarded. (Since in many embodiments a large number of database objects may be involved in the migration with copying from the source server system to the target server system initiating for various database objects at different times, change requests that may affect a first database object may not be relevant to another database object which was started to be copied at a later time.) Change requests stored by modification tray 320 having a later SCN than the SCN corresponding to initialization of the copy may be inspected. If the change request relates to the database object, the database object at the target server system may be changed in accordance with the change request. After the database object stored by the target server system has been updated, the change request stored by the modification tray 320 may be logged as completed or may be deleted from modification tray 320. Such use of modification tray 320 and propagation engine 340 may occur for each database object being copied from the source server system to the target server system.

After the database object has been copied from the source server system to the target server system and changes stored in modification tray 320 have been used to update the database object as stored by target server system, change requests may continue to be received and processed by the still-online source server system to modify the database objects maintained by the source server system. Further, these change requests may continue to be received and processed by replication monitoring engine 310, assigned an SCN by chronological identifier counter 330, and stored in modification tray 320. When the necessary source server system and target server system resources are available, propagation engine 340 may cause the change request from modification tray 320 to update the corresponding database object of the target server system. As such, when a change request is received by the source server system, the modification tray 320 can be understood as serving as a buffer for change requests to be implemented at the target server system. In most embodiments, propagation engine 340 can cause change requests at the target server system to be implemented at a faster rate than at which change requests are being received by the source server system. Therefore, over time, the number of change requests to be implemented from modification tray 320 at the target server system can be expected to decrease as any backlog of change requests stored by modification tray 320 is implemented in the database objects stored by the target server system.

Figure 4:
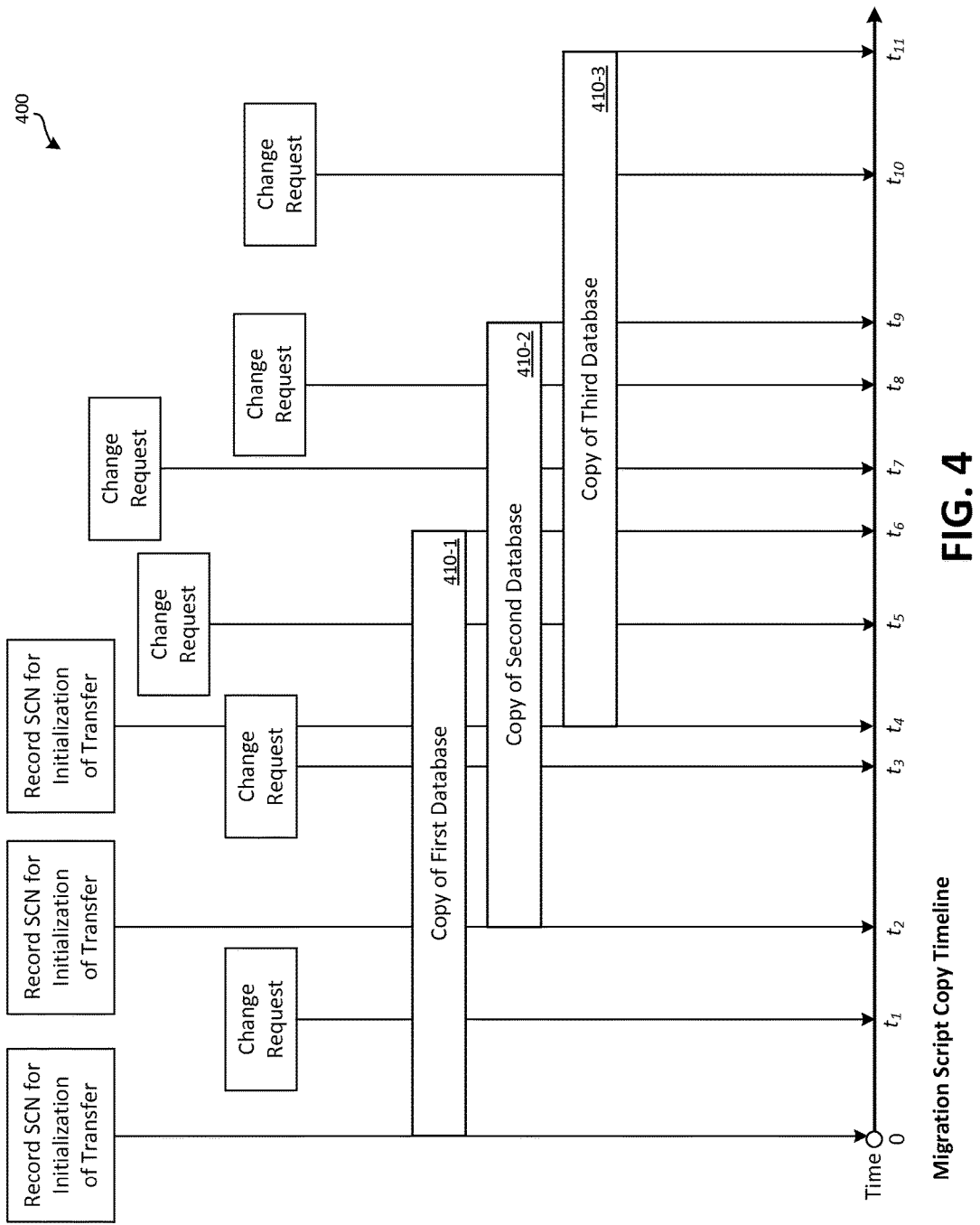
FIG. 4 illustrates an embodiment of an exemplary timeline for processing change requests for records within databases of a source server system while the databases are being migrated between server systems.

FIG. 4 illustrates an embodiment of an exemplary timeline 400 for processing change requests for records within databases of a source server system while the databases are being migrated between server systems. In exemplary timeline 400, three databases are being migrated from a source server system, such as source server system 110 of FIG. 1, to a target server system, such as target server system 120 of FIG. 1. This copying of the databases from the source server system to the target server system during the migration may be performed while the source server system is online. A scheduler computer system may determine when multiple databases from source server system are to be copied to target server system.

At time zero, the scheduler computer system causes a copy of a first database to initialize. Copy of the first database 410-1 may occur from time zero until $t_6$. Corresponding to time zero, an SCN may be recorded that indicates the copy of the first database has commenced. Copy of first database 410-1 may be a copy of an image of the first database as stored by the source server system at time zero. A change request may be received at $t_1$ by source server system. The change request of $t_1$ may request a change to a record in the second database. In response to this change request, the second database may be updated and the change request may be stored by a modification replicator, such as modification replicator 116 in associated with an SCN that indicates a later time than the SCN recorded at time zero.

At time $t_2$, the scheduler computer system causes a copy of a second database to initialize. Copy of the second database 410-2 may occur from $t_2$ until $t_9$. Corresponding to $t_2$, an SCN may be recorded that indicates the copy of the second database has commenced. This SCN would be chronologically later than SCNs corresponding to the initialization at time zero or the change request at $t_1$. From $t_2$ until $t_6$, the first database and the second database are being copied in parallel from the source server system to the target server system. At $t_3$, another change request is received by the online source server system. The change request of $t_3$ may request a change to a record in the first database. The change request of $t_3$ may be processed by the source server system such that the first database is updated while the copy of the first database is ongoing. However, the version of the first database, as being copied to the target server system, may not be affected (e.g., the first database may be able to store multiple values for a field, sorted based on SCN). Further, the change request of $t_3$ may be stored by a modification replicator, such that the SCN associated with the change request of $t_3$ is recorded along with the change request of $t_3$ in a modification tray. At some time after $t_6$, when the first database has completed being copied, the modification replicator may cause the change request of $t_3$ to be implemented at the corresponding database of the target server system.

At time $t_4$, the scheduler computer system causes a copy of a third database to initialize. Copy of the third database 410-3 may occur from $t_4$ until $t_{11}$. Corresponding to $t_4$, an SCN may be recorded that indicates the copy of the third database has commenced. This SCN would be chronologically later than SCNs corresponding to the events at time zero, $t_1$, $t_2$, and $t_3$. From $t_4$ until $t_6$, the first database, the second database, and the third database are being copied in parallel from the source server system to the target server system. From $t_4$ until $t_9$, the second and third databases are being copied in parallel. At $t_5$, another change request is received by the online source server system. The change request of $t_5$ may request a change to a record in the third database. The change request of $t_5$ may be processed by the source server system such that the third database is updated at the source server system. However, the snapshot of the third database from $t_4$, as being copied to the target server system, may not be affected. Further, the change request of $t_5$ may be logged by a modification replicator, such that the SCN associated with the change request of $t_5$ is recorded along with the change request. At some time after $t_{11}$, when the third database has completed being copied to the target server system, the modification replicator may cause the change request of $t_5$ to be implemented at the target server system.

At $t_6$, the copy of first database 410-1 may complete. This copy is a snapshot of the first database at time zero. Change requests related to the first database, such as the change request of $t_3$, may be implemented at the copy of the first database stored by the target server system after $t_6$. At $t_7$, another change request is received by the online source server system. The change request of $t_7$ may request a change to a record in the first database. The change request of $t_7$ may be processed by the source server system such that the first database stored by the source server system is updated. While the first database has been initially copied to the target server system, the change request may need to be pushed to the target server system for implementation. The change request of $t_7$ may be logged by the modification replicator, such that the SCN associated with change request $t_7$ is recorded along with the change request. At some time when sufficient resources are available, the change request of $t_7$ may be implemented at the copy of the database residing at the target server system because the SCN of the change request of $t_7$ indicates a later time than the SCN of time zero, which is when copy of the first database was initialized.

At $t_8$, another change request is received by the online source server system. Change request $t_8$ may request a change to a record in the second database. Change request $t_8$ may be processed by the source server system such that the second database is updated at the source server system. However, the second database, as being copied to the target server system, may not be affected. Further, the change request of $t_8$ may be logged by the modification replicator, such that the SCN associated with change request $t_8$ is recorded along with the change request of $t_8$. At some time after $t_9$, when the second database has completed being copied, the modification replicator may cause the change request of $t_8$ to be implemented at the copy of the second database stored by target server system because the SCN of the change request of $t_8$ indicates a time after the SCN related to the initialization of the copy of the second database at $t_2$.

At $t_9$, the copy of second database 410-2 may complete. This copy was a snapshot of the second database at $t_2$. Change requests related to the second database, such as the change request of $t_8$, may be implemented at the copy of the second database stored by the target server system after $t_9$. However, the change request of $t_1$, which was implemented before $t_2$, would not need to be implemented in the copy of the second database stored by the target server system because the snapshot of the database at $t_2$ already contains the change. This condition is indicated by a comparison of the SCNs of the change request of $t_1$ and the SCN related to the initialization of the copy of the second database at $t_2$.

At $t_{10}$, another change request is received by the online source server system. The change request of $t_{10}$ may request a change to a record in the third database. The change request of $t_{10}$ may be processed by the source server system such that the third database is updated. While the third database is in the process of being copied to the target server system, the change request of $t_{10}$ will need to be pushed to the target server system at a later time. Change request $t_{10}$ may be logged by the modification replicator, such that the SCN associated with the change request of $t_{10}$ is recorded along with a copy of the change request in a modification tray. At some time after $t_{11}$, when the copy of the snapshot of third database 410-3 is complete, the change request of $t_{10}$ may be implemented at the copy of the third database residing at the target server system based on a comparison of the SCN of the change request of $t_{10}$ and the SCN associated with initialization of the copy of the third database at $t_4$.

At some time later than $t_{11}$, when all databases have been copied to the target server system from the source server system and all change requests stored by the modification replicator have been implemented, the source server system may be taken offline and the target server system may be brought online to complete the migration.

It should be understood that exemplary timeline 400 may be a simplified example. In some arrangements, thousands of database objects may be present which need to be copied from a source server system to the target server system. Some of these database objects may take seconds to copy, while others may take hours or days.

Figure 5:
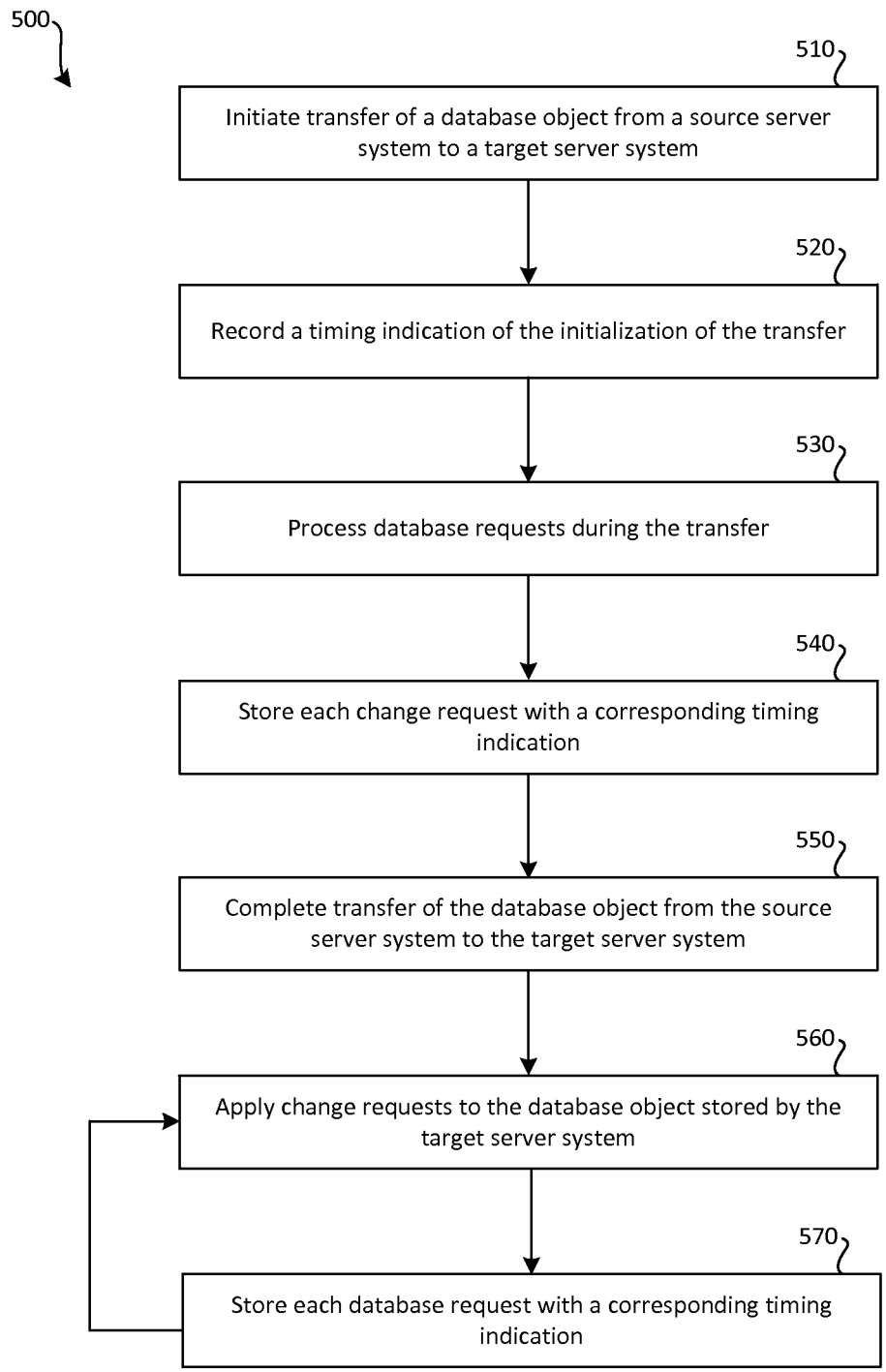
FIG. 5 illustrates an embodiment of a method for performing an online migration between server systems.

Various methods may be performed using the systems described in relation to FIGS. 1-3. FIG. 5 illustrates an embodiment of a method 500 for performing an online migration between server systems. The migration of method 500 involves the transfer of a database object from a source server system to a target server system, such as described in relation to FIG. 1. It should be understood that the concept of method 500 may be applied to multiple database objects being transferred between the source server system and the target server system. Such transfer of multiple database objects may involve transfer of database objects at least partially in parallel, such as exemplified in relation to FIG. 4. The steps of method 500 may be performed by system 100 of FIG. 1 or some other system configured to perform an online migration between server systems. As such, means for performing method 500 can include one or more instances of components of system 100 of FIG. 1. The steps of method 500 may be performed using one or more instances of the computer components of computer system 700 of FIG. 7. The steps of method 500 may be performed while the source server system is online (meaning the source server system is receiving and fulfilling database requests, including database change requests).

At step 510, a transfer of the database object, such as a database table, from the source server system to the target server system may be initiated. The transfer of the database object at step 510 takes a period of time to complete. During this period of time, any changes made to the database object being transferred may not be reflected in the version of the database copied to the target server system. The initiation of the transfer of the database object at step 510 may be based on a scheduler computer system causing the source server system to execute a migration copy script. This migration copy script may cause the database object to be copied from the source server system to the target server system.

At step 520, a timing indication that corresponds to the initialization of the transfer at step 510 may be recorded. This timing indication may be an SCN. The SCN recorded at step 520 may be created chronologically. Therefore, events associated with lower SCNs may have occurred prior to the initialization of the transfer at step 510; events associated with higher SCNs may have occurred after the initialization of the transfer at step 510. It should be understood that in other embodiments a timing indication may take a form other than SCNs.

At step 530, the source server system may process various database requests involving the database being transferred. Therefore, at step 530, while database requests are being processed by the source server system, the transfer of the database object is ongoing. One form of database request which may be processed at step 530 is a read request. In response to the read request, the source server system may indicate the current value of one or more fields of one or more records of the database object. The value returned in response to the read request may not match the value being copied to the target server system as part of the transfer. The transfer involves copying a snapshot of the database current as of the time of initialization of the copy to the target server system. If the value is changed (e.g., in response to a change command) after initialization at step 510 but before the read request, the value returned in response to the read request will vary from the value copied to the target server system. Another form of database request which may be processed at step 530 is a change request. Such a change request may include modifying one or more fields of one or more records the database, adding a record to the database, or deleting records from the database. Change requests may be processed at step 530 by the source server system updating the database object in accordance with the change request. However, the snapshot of the database being transferred to the target server system will not initially reflect the change request.

At step 540, for each change request that causes a change to the database object stored by the source server system, a copy of the database request may be stored along with a timing indication. Again here, the timing indication may be an SCN. Referring to FIG. 1, modification replicator 116 may store a copy of each change request that is processed by source server system 110 (to this database object and other database objects). Modification replicator, referring now to FIG. 3, may store the copy of the change request to modification tray 320 along with the SCN (or other form of chronological identifier).

At step 550, the transfer of the database object from the source server system to the target server system may be completed. The version of the database object transferred to the target server system may be only current as of the initialization of the transfer at step 510. Therefore, any change request that resulted in the source server system modifying the database object after initialization of the transfer may not be reflected in the version of the database now stored by the target server system. If the size of the database object was small, the amount of time elapsing from step 510 to step 550 may be small, such as several seconds; however, if the size of the database object is large (e.g., hundreds of gigabytes), the amount of time elapsing may be significantly longer, such as several hours or possibly more than a day. Depending on how long the transfer of the database object took and how frequently records of the database object are modified, it may be possible that very few change requests were received and processed at step 530 and stored at step 540; it may also be possible that millions of change requests were received and processed at step 530 and stored at step 540 and now need to be propagated to the version of the database stored by the target server system to bring it up-to-date. At step 550, a stale version of the database has been fully copied to the target server system. The source server system, meanwhile, is still online, maintaining the up-to-date version of the database object, and handling all database requests.

At step 560, the change requests stored by the modification replicator at step 540 may be analyzed. Each change request linked with an SCN indicative of a time before the SCN linked with the initialization of the transfer of the database object at step 510 may be ignored. Each change request linked with an SCN indicative of a time after the SCN linked with the initialization of the transfer of the database object at step 510 and that corresponds to the database object may be applied to the copy of the database object stored by the target server system. The backlog of change requests stored at step 530 may be applied to the database at the target server system until the database at the target server system is up-to-date and matches the content of the database stored by the source server system.

At step 570, while the source server system is still online (and the target server system is offline), database requests, including change requests, may continue to be received and processed by the source server system. The source server system may update the corresponding database object in accordance with the change requests. At step 570, each change request may be stored by the modification replicator and linked with an SCN. Each of these change requests, due to the SCNs of these change requests being indicative of a time after the SCN of the initialization of step 510, will be queued and applied to the corresponding database object stored by the target server system at step 560. Therefore, while the source server system remains online and the target server system offline, database objects copied to the target server system continue to be updated to match the content of the database objects of the source server system. Steps 560 and 570 may continue to repeat as long as the source server system is online and is processing database requests.

Figure 6:
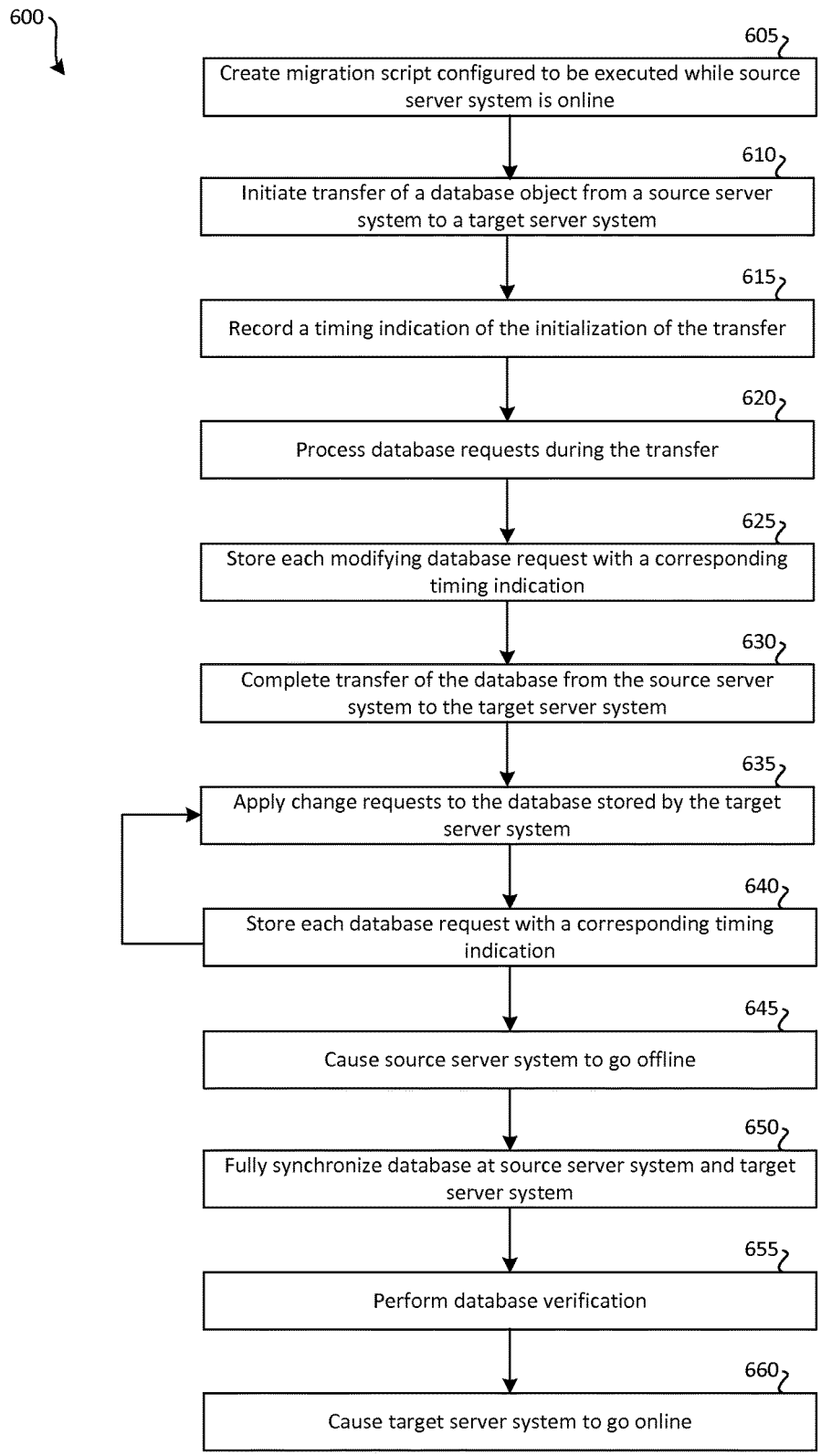
FIG. 6 illustrates another embodiment of a method for performing an online migration between server systems.

FIG. 6 illustrates an embodiment of a method 600 for performing an online migration between server systems. The migration of method 600 involves the transfer of a database object from a source server system to a target server system, such as described in relation to FIG. 1. It should be understood that the concept of method 600 may be applied to multiple database objects being transferred between the source server system and the target server system. Such transfer of multiple database objects may involve transfer of database objects at least partially in parallel, such as exemplified in relation to FIG. 4. The steps of method 600 may be performed by system 100 of FIG. 1 or some other system configured to perform an online migration between server systems. As such, means for performing method 600 can include one or more instances of components of system 100 of FIG. 1. The steps of method 600 may be performed using one or more instances of the computer components of computer system 700 of FIG. 7. The steps of method 600 may be performed while the source server system is online (meaning the source server system is receiving and fulfilling database requests, including database change requests). Method 600 may represent a more detailed embodiment of method 500 of FIG. 5.

At step 605, a migration script may be created to copy a database object from a source server system to a target server system. The migration script may be configured to be performed while the migration script is online. The migration script may be created to, when executed, efficiently copy the database object from the source server system to the target server system. At step 610, a transfer of the database object, such as a database table, from the source server system to the target server system may be initiated. The transfer of the database object at step 610 takes a period of time to complete. During this period of time, any changes made to the database object being transferred may not be reflected in the version of the database copied to the target server system. The initiation of the transfer of the database object at step 610 may be based on a scheduler computer system causing the source server system to execute a migration copy script. Referring to FIG. 1, scheduler computer system 130 may cause execution of the migration copy script by source server system 110; this migration copy script may cause the database object to be copied from the source server system to the target server system. In addition to the transfer of the database object from the source server system to the target server system, the database object may be reorganized, reformatted, compressed, or otherwise reworked at the target server system to decrease its size and/or increase performance.

At step 615, a timing indication that corresponds to the initialization of the transfer at step 610 may be recorded. This timing indication may be an SCN. The SCN recorded at step 615 may be created chronologically. Therefore, events associated with lower SCNs may have occurred prior to the initialization of the transfer at step 610; events associated with higher SCNs may have occurred after the initialization of the transfer at step 610. It should be understood that in other embodiments a timing indication may take a form other than SCNs.

At step 620, the source server system may process various database requests involving the database being transferred. Therefore, at step 620, while database requests are being processed by the source server system, the transfer of the database object is ongoing. One form of database request which may be processed at step 620 is a read request. Another form of database request which may be processed at step 620 is a change request. Such a change request may include modifying one or more fields of one or more records the database, adding a record to the database, or deleting records from the database. Change requests may be processed at step 620 by the source server system updating the database object in accordance with the change request.

At step 625, for each change request that causes a change to the database object stored by the source server system, a copy of the database request may be stored along with a timing indication. Again here, the timing indication may be an SCN. Referring to FIG. 1, modification replicator 116 may store a copy of each change request that is processed by source server system 110 (to this database object and other database objects). Modification replicator, referring now to FIG. 3, may store the copy of the change request to modification tray 320 along with the SCN (or other form of chronological identifier).

At step 630, the transfer of the database object from the source server system to the target server system may be completed. The version of the database object transferred to the target server system may be only current as of the initialization of the transfer at step 610. Therefore, any change request that resulted in the source server system modifying the database object after initialization of the transfer may not be reflected in the version of the database now stored by the target server system. At step 630, a stale version of the database has been fully copied to the target server system. The source server system, meanwhile, is still online, maintaining the up-to-date version of the database object, and handling all database requests.

At step 635, the change requests stored by the modification replicator at step 625 may be analyzed. Each change request linked with an SCN indicative of a time before the SCN linked with the initialization of the transfer of the database object at step 610 may be ignored. Each change request linked with an SCN indicative of a time after the SCN linked with the initialization of the transfer of the database object at step 610 and that corresponds to the database object may be applied to the copy of the database object stored by the target server system. The backlog of change requests stored at step 625 may be applied to the database at the target server system until the database at the target server system is up-to-date and matches the content of the database stored by the source server system.

At step 640, while the source server system is still online (and the target server system is offline), database requests, including change requests, may continue to be received and processed by the source server system. The source server system may update the corresponding database object in accordance with the change requests. At step 640, each change request may be stored by the modification replicator and linked with an SCN. Each of these change requests, due to the SCNs of these change requests being indicative of a time after the SCN of the initialization of step 610, will be queued and applied to the corresponding database object stored by the target server system at step 640. Therefore, while the source server system remains online and the target server system offline, database objects copied to the target server system continue to be updated to match the content of the database objects of the source server system. Steps 635 and 640 may continue to repeat as long as the source server system is online and is processing database requests. If the database objects of the source server system receive change requests frequently, there may be a continuous queue of change requests that will need to be applied to the database objects stored by the target server system. Therefore, as long as the source server system is online, there may be an amount of lag between the up-to-date database objects of the source server system and the database objects of the target server system that are updated via the propagation engine.

At step 645, the online source server system may be taken offline to complete the migration. At this point, all database objects may have been copied to the target server system. Both server systems are now offline; thus neither server system is receiving or responding to database requests. At step 650, all remaining change requests that have been implemented at the source server system but not at the target server system and are queued by the modification replicator may be applied to the target server system. Since change requests have been continually pushed to the target server system, it can be expected that few change requests need to be implemented at the target server system from the modification tray. Once these final change requests are applied to the corresponding database objects of the target server system, the content database objects of the target server system should match the database objects of the source server system. Therefore, following step 650, the source server system and the target server system are fully synchronized. Structurally, the database objects of the source server system and the target server system may not match because, when the database objects were copied, some or all of the database objects may have been reformatted or reorganized for efficiency. Database objects may also have been compressed to save storage space.

If desired by the customer, some or all of the database objects of the source server system may be compared with the corresponding database objects of the target server system as a verification of the migration at step 655. One form of verification may be a row count. Rather than comparing values present in individual records of tables of database objects, the number of records (rows) in a database object of the source server system may be compared with the number of records in a corresponding database object of the target server system. If the number of rows match, the customer can at least be assured that it was unlikely any records were lost during the transfer. While, ideally, each value present in each record may be compared between the source server system and the target server system, such a comparison may take a significant amount of time. During this time, both the source server system and the target server system may be offline; thus neither server system is responding to database requests. A customer may be willing to accept the less-thorough comparison of a row count due to the increased speed in this form of verification process.

At step 660, the target server system may be brought online. In some instances, the database administrator overseeing the migration may bring the target server system online. The database administrator may bring the target server system in-person or via a remote administrator computer system, which may communicate with the source server system and the target server system via a network. The database administrator may bring the target server system online when the customer is satisfied, based on the verification of the database objects, that the database objects of the target server system match the content of the database objects of the source server system. Following step 660, the target server system may now respond to database requests. The source server system remains offline, in many instances permanently.

Figure 7:
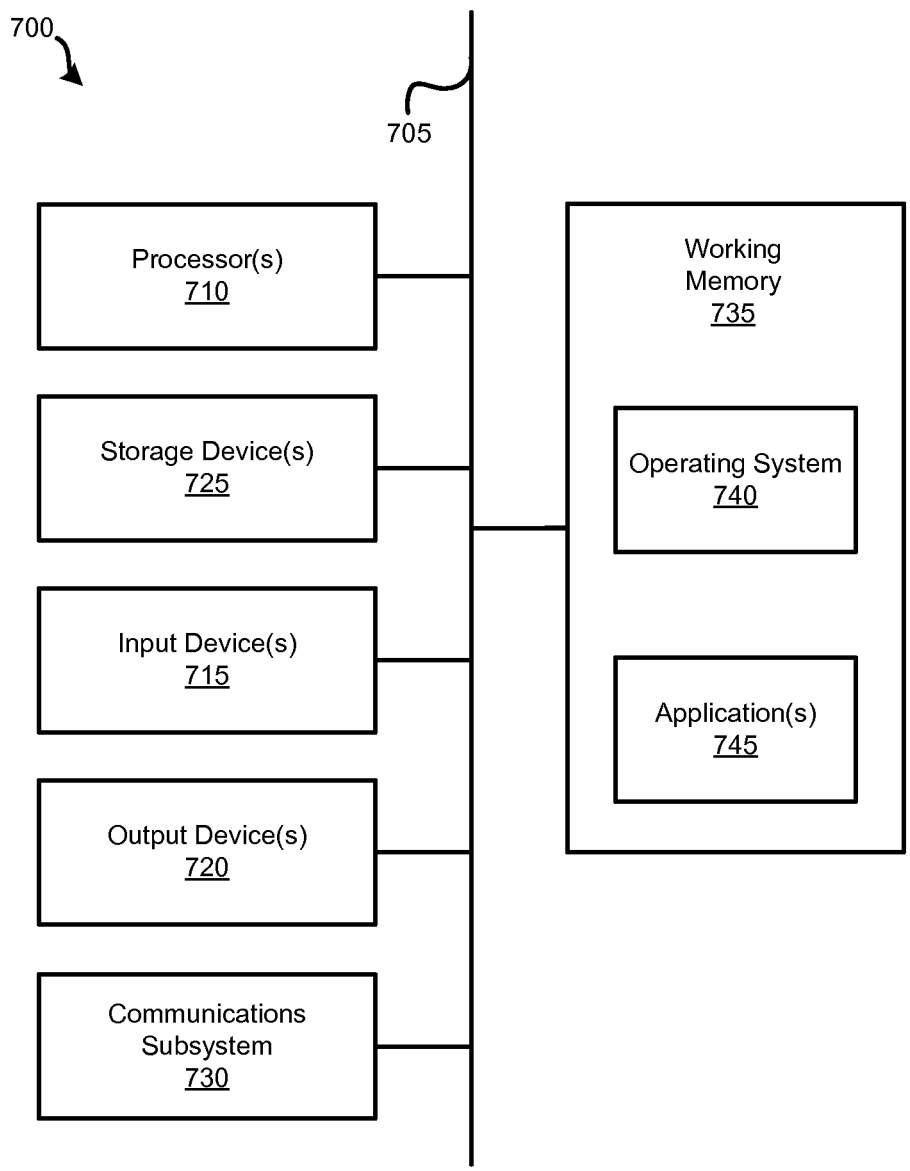
FIG. 7 illustrates an embodiment of a computer system.

FIG. 7 illustrates an embodiment of a computer system. A computer system as illustrated in FIG. 7 may be incorporated as part of the previously described computerized devices, such as the source server system, target server system, and remote administrator computer system. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing an online migration of a plurality of databases between server systems, the method comprising:

initiating transfer, from a source database server in a source server system to a target database server in a target server system, of a plurality of databases, wherein the source server system is online and responding to database requests during transfer of the plurality of databases, and wherein the source database server and the target database server are distinct servers;

for each particular database within the plurality of databases:

determining, using a scheduler computer system, a particular time at which the particular database is to be copied to the target database server;

initializing, by the scheduler computer system, copying of the particular database to the target database server at the determined particular time; and recording, by the source server system, a chronological indication of when the copying of the particular database was initialized by the scheduler computer system,
wherein the copying of each of the plurality of databases is initialized by the scheduler computer system at a different time, and wherein the copying of each of the plurality of databases requires a different length of time;
during the copying of the plurality of databases, receiving, by the source server system, a plurality of change requests, each change request associated with at least one of the plurality of databases;
storing, by the source server system, the plurality of change requests and, for each change request of the plurality of change requests, a chronological indication of when the change request was received; and
for each particular change request of the received plurality of change requests:
determining one or more of the particular databases affected by the particular change request;
comparing the chronological indication of when the particular change request was received to the one or more chronological indications of when the copying of the one or more of the particular affected databases was initialized; and
determining whether to apply the particular change request to the source server system or the target server system, based on the comparison of the chronological indication of when the particular change request was received to the chronological indications of when the copying of the particular affected databases was initialized; and
verifying, by the target server system, the plurality of databases.

2. The method for performing the online migration of the plurality of databases between server systems of claim 1, wherein the chronological indications of when the plurality of change requests were received are numbers assigned chronologically to database transactions performed by the source server system.

3. The method for performing the online migration of the plurality of databases between server systems of claim 1, wherein determining whether to apply a first particular change request to the source server system or the target server system comprises:
determining a first database affected by the first particular change request;
accessing a chronological indication indicative of when the copying of the first database was initialized; and
determining to apply the first change request to the first database as stored by the target server system based on determining that the chronological indication of when the first change request was received is greater than the chronological indication indicative of when the copying of the first database was initialized.

4. The method for performing the online migration of the plurality of databases between server systems of claim 3, wherein determining whether to apply a second particular change request to the source server system or the target server system comprises:
determining a second database affected by the second particular change request;
accessing a chronological indication indicative of when the copying of the second database was initialized; and
determining to apply the second change request to the second database as stored by the source server system based on determining that the chronological indication of when the second change request was received is less than the chronological indication indicative of when the copying of the second database was initialized.

5. The method for performing the online migration of the plurality of databases between server systems of claim 1, the method further comprising:
after copying the plurality of databases to the target database server and applying one or more of the plurality of change requests to the databases stored by the target server system while the source server system is online, causing the source server system to go offline such that the source server system does not respond to database requests; and
after causing the source server system to go offline, causing the target server system to go online such that the target server system responds to database requests.

6. The method for performing the online migration of the plurality of databases between server systems of claim 1, the method further comprising:
while copying the plurality of databases, receiving an increase in a number of migration scripts to run in parallel by the source server system; and
in response to the increase in the number of migration scripts, initiating, by the source server system, transfer of an additional database to the target database server.

7. The method for performing the online migration of the plurality of databases between server systems of claim 1, wherein each of the databases copied to the target database server matches the corresponding database stored in the source database server when copying of the database was initialized.

8. The method for performing the online migration of the plurality of databases between server systems of claim 1, further comprising:
in response to determining that a particular change request is to be applied to the source server system instead of the target server system:
after copying one or more databases affected by the particular change request to the target database server, applying the particular change requests to the affected databases within the target server system while the source server system is online and responding to database requests.

9. The method for performing the online migration of the plurality of databases between server systems of claim 1, wherein one or more index database objects reside in the source server system corresponding to the plurality of databases, and wherein the method further comprises:
generating one or more corresponding index database objects for the plurality of databases copied to the target server system, wherein the index database objects residing the source server system are not copied to the target server system.

10. A system for performing an online migration between server systems, the system comprising:
a source server system, configured to:
initiate a transfer, from a source database server in the source server system to a target database server in a target server system, of a plurality of databases, wherein the source server system is online and responding to database requests during transfer of the plurality of databases, and wherein the source database server is distinct from the target database server;
for each particular database within the plurality of databases:

determine, using a scheduler computer system, a particular time at which the particular database is to be copied to the target database server;

initialize, by the scheduler computer system, copying of the particular database to the target database server at the determined particular time, and record a chronological indication of when the copying of the particular database was initialized by the scheduler computer system, wherein the copying of each of the plurality of databases is initialized by the scheduler computer system at a different time, and wherein the copying of each of the plurality of databases requires a different length of time; during the transferring of the plurality of databases, receive a plurality of change requests, each change request associated with at least one of the plurality of databases, store the plurality of change requests and, for each change request of the plurality of change requests, a chronological indication of when the change request was received; and for each particular change request of the received plurality of change requests;

determine one or more of the particular databases affected by the particular change request;

compare the chronological indication of when the particular change request was received to the one or more chronological indications of when the copying of the one or more of the particular affected databases was initialized; and determine whether to apply the particular change request to the source server system or the target server system, based on the comparison of the chronological indication of when the particular change request was received to the chronological indications of when the copying of the particular affected databases was initialized.

11. The system for performing the online migration between server systems of claim 10, wherein the chronological indications of when the plurality of change requests were received are numbers assigned chronologically to database transactions performed by the source server system.

12. The system for performing the online migration between server systems of claim 10, wherein determining whether to apply a first particular change request to the source server system or the target server system comprises:

determining a first database affected by the first particular change request;

accessing a chronological indication indicative of when transfer of a first object was initiated; and accessing a chronological indication indicative of when transfer of the first database was initiated; and determine to apply the first change request to the first database as stored by the target server system based on determining that the chronological indication of when the first change request was received is greater than the chronological indication indicative of when transfer of the first database was initialized.

13. The system for performing the online migration between server systems of claim 12, wherein determining whether to apply a second particular change request to the source server system or the target server system comprises:

determining a second database affected by the second particular change request;

accessing a chronological indication indicative of when transfer of the second database was initiated; and determining to apply the second change request to the second database as stored by the source server system based on determining that the chronological indication of when the second change request was received is less than the chronological indication indicative of when transfer of the second database was initialized.

14. The system for performing the online migration between server systems of claim 10, wherein:

after transferring the plurality of databases to the target database server and applying one or more of the plurality of change requests to the databases stored by the target server system while the source server system is online, the source server system being configured to go offline such that the source server system does not respond to database requests; and after the source server system is offline, the target server system being configured to go online such that the target server system responds to database requests.

15. The system for performing the online migration between server systems of claim 10, wherein the source server system is further configured to receive an increase in a number of migration scripts to run in parallel; and in response to the increase in the number of migration scripts, the source server system being configured to initiate transfer of an additional database to the target database server.

16. A computer-readable memory device comprising a set of instructions stored therein which, when executed by a processor, cause the processor to perform an online migration between database systems by:

initiating a transfer, from a source database server in a source database system to a target database server in a target database system, of a plurality of databases, wherein the source database system is online and responding to database requests during transfer of the plurality of databases, and wherein the source database server and the target database server are distinct servers;

for each particular database within the plurality of databases:

determining, using a scheduler computer system, a particular time at which the particular database is to be copied to the target database server;

initializing, by the scheduler computer system, copying of the particular database to the target database server at the determined particular time; and recording a chronological indication of when the copying of the particular database was initialized by the scheduler computer system, wherein the copying of each of the plurality of databases is initialized by the scheduler computer system at a different time, and wherein the copying of each of the plurality of databases requires a different length of time;

receiving a plurality of change requests while copying the plurality of databases, each change request associated with at least one of the plurality of databases;

storing the plurality of change requests and, for each change request of the plurality of change requests, a chronological indication of when the change request was received; and for each particular change request of the received plurality of change requests:

determining one or more of the particular databases affected by the particular change request;

comparing the chronological indication of when the particular change request was received to the one or more chronological indications of when the copying of the one or more of the particular affected databases was initialized; and determining whether to apply the particular change request to the source database system or the target database system, based on the comparison of the chronological indication of when the particular change request was received to the chronological indications of when the copying of the particular affected databases was initialized; and verifying the plurality of databases.

17. The computer-readable memory device of claim 16, wherein the chronological indications of when the plurality of change requests were received are numbers assigned chronologically to database transactions performed by the source database system.

18. The computer-readable memory device of claim 16, wherein determining whether to apply a first particular change request to the source server system or the target server system comprises:

determining a first database affected by the first particular change request;

accessing a chronological indication indicative of when the copying of the first database was initialized; and determining to apply the first change request to the first database as stored by the target server system based on determining that the chronological indication of when the first change request was received is greater than the chronological indication indicative of when the copying of the first database was initialized.

19. The computer-readable memory device of claim 18, wherein determining whether to apply a second particular change request to the source server system or the target server system comprises:

determining a second database affected by the second particular change request;

accessing a chronological indication indicative of when the copying of the second database was initialized; and determining to apply the second change request to the second database as stored by the source server system based on determining that the chronological indication of when the second change request was received is less than the chronological indication indicative of when the copying of the second database was initialized.

20. The computer-readable memory device of claim 16, further comprising instructions stored therein which, when executed by the processor, cause the processor to perform an online migration between database systems by:

while copying the plurality of databases, receiving an increase in a number of migration scripts to run in parallel by the source server system; and in response to the increase in the number of migration scripts, initiating, by the source server system, transfer of an additional database to the target database server.

* * * * *

UNITED STATES PATENT AND TRADEMARK OFFICE
CERTIFICATE OF CORRECTION

PATENT NO.         : 9,792,321 B2
APPLICATION NO.    : 13/937545
DATED              : October 17, 2017
INVENTOR(S)        : Stephan Buehne and Elmar Spiegelberg It is certified that error appears in the above-identified patent and that said Letters Patent is hereby corrected as shown below:

In the Claims

Claim 10, Column 29, Line 6:
Please remove "time," and Insert --time;--

Signed and Sealed this
Fifteenth Day of January, 2019

Andrei Iancu
*Director of the United States Patent and Trademark Office*